(12) United States Patent
Maeda et al.

(10) Patent No.: US 11,150,502 B2
(45) Date of Patent: *Oct. 19, 2021

(54) DISPLAY SUBSTRATE AND DISPLAY DEVICE

(71) Applicant: SHARP KABUSHIKI KAISHA, Sakai (JP)

(72) Inventors: Masaki Maeda, Sakai (JP); Yoshihito Hara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 181 days.

This patent is subject to a terminal disclaimer.

(21) Appl. No.: 16/491,907

(22) PCT Filed: Mar. 2, 2018

(86) PCT No.: PCT/JP2018/007950
§ 371 (c)(1),
(2) Date: Dec. 16, 2019

(87) PCT Pub. No.: WO2018/163983
PCT Pub. Date: Sep. 13, 2018

(65) Prior Publication Data
US 2021/0141258 A1    May 13, 2021

(30) Foreign Application Priority Data
Mar. 10, 2017  (JP) .............................. JP2017-045932

(51) Int. Cl.
G06F 3/045    (2006.01)
G02F 1/1333   (2006.01)
G02F 1/1362   (2006.01)
G02F 1/1337   (2006.01)
G06F 3/041    (2006.01)
G06F 3/044    (2006.01)
G02F 1/1343   (2006.01)
G02F 1/1368   (2006.01)

(52) U.S. Cl.
CPC ........ G02F 1/13338 (2013.01); G02F 1/1337 (2013.01); G02F 1/13629 (2021.01);
(Continued)

(58) Field of Classification Search
USPC .......... 345/174, 80, 90, 92; 349/38, 43, 113, 349/158; 257/66
See application file for complete search history.

(56) References Cited

U.S. PATENT DOCUMENTS

2002/0145683 A1* 10/2002 Murade ............. G02F 1/136209
349/43
2003/0184705 A1* 10/2003 Murade ............. G02F 1/136209
349/158

(Continued)

FOREIGN PATENT DOCUMENTS

JP    2008-145461 A    6/2008
JP    2015-122057 A    7/2015

Primary Examiner — Thuy N Pardo
(74) Attorney, Agent, or Firm — ScienBiziP, P.C.

(57) ABSTRACT

A display substrate includes a substrate, a first insulator, a metal film, a second insulator, an alignment film, a line, and film forming area defining recesses. The substrate includes a display area and a non-display area. The metal film is disposed upper than the first insulator. The second insulator is disposed upper than the metal film and has a thickness smaller than a thickness of the first insulator. The alignment film is disposed upper than the second insulator at least in the display area. The line extends to straddle the display area and the non-display area and includes a section of the metal film. The film forming area defining recesses are provided in the non-display area to extend to cross the line and include recesses sections of the second insulator to define a forming area of the alignment film.

10 Claims, 11 Drawing Sheets

(52) U.S. Cl.
CPC ............ *G06F 3/044* (2013.01); *G06F 3/0412*
(2013.01); *G02F 1/1368* (2013.01); *G02F*
*1/134372* (2021.01); *G02F 1/136227*
(2013.01); *G02F 2201/122* (2013.01); *G02F*
*2201/123* (2013.01)

(56) References Cited

U.S. PATENT DOCUMENTS

| | | | |
|---|---|---|---|
| 2007/0121038 A1* | 5/2007 | Ishii | G02F 1/133555 |
| | | | 349/113 |
| 2007/0273800 A1* | 11/2007 | Nomura | G02F 1/136227 |
| | | | 349/38 |
| 2008/0137022 A1 | 6/2008 | Komeno et al. | |
| 2008/0143664 A1* | 6/2008 | Nakagawa | G02F 1/136286 |
| | | | 345/92 |
| 2010/0014042 A1 | 1/2010 | Komeno et al. | |
| 2010/0078644 A1* | 4/2010 | Park | H01L 27/1292 |
| | | | 257/66 |
| 2015/0177880 A1 | 6/2015 | Shin et al. | |
| 2015/0277168 A1* | 10/2015 | Takanishi | H01L 29/78606 |
| | | | 349/43 |
| 2015/0301639 A1 | 10/2015 | Shin et al. | |
| 2016/0012766 A1 | 1/2016 | Shin et al. | |
| 2016/0291366 A1* | 10/2016 | Hara | G02F 1/1345 |
| 2018/0217423 A1* | 8/2018 | Suzuki | G02F 1/13394 |
| 2019/0324311 A1* | 10/2019 | Yuminami | G02F 1/1337 |
| 2020/0127020 A1* | 4/2020 | Tsuno | G02F 1/136227 |

* cited by examiner

FIG.1
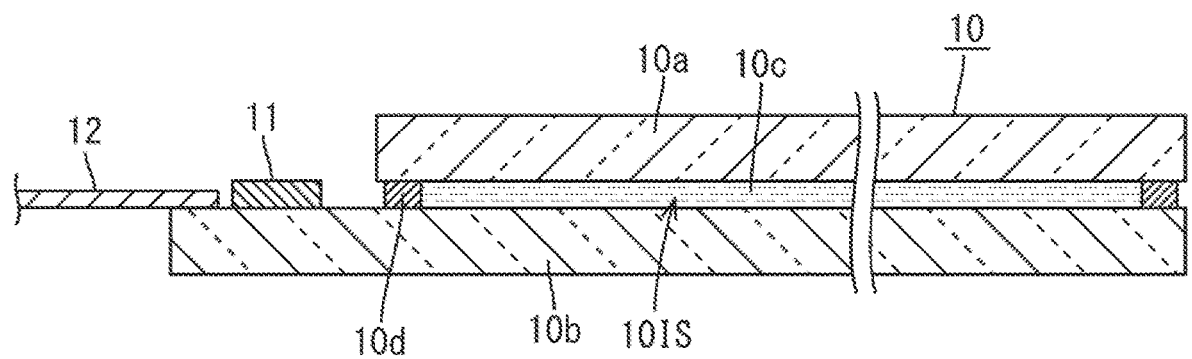
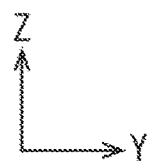

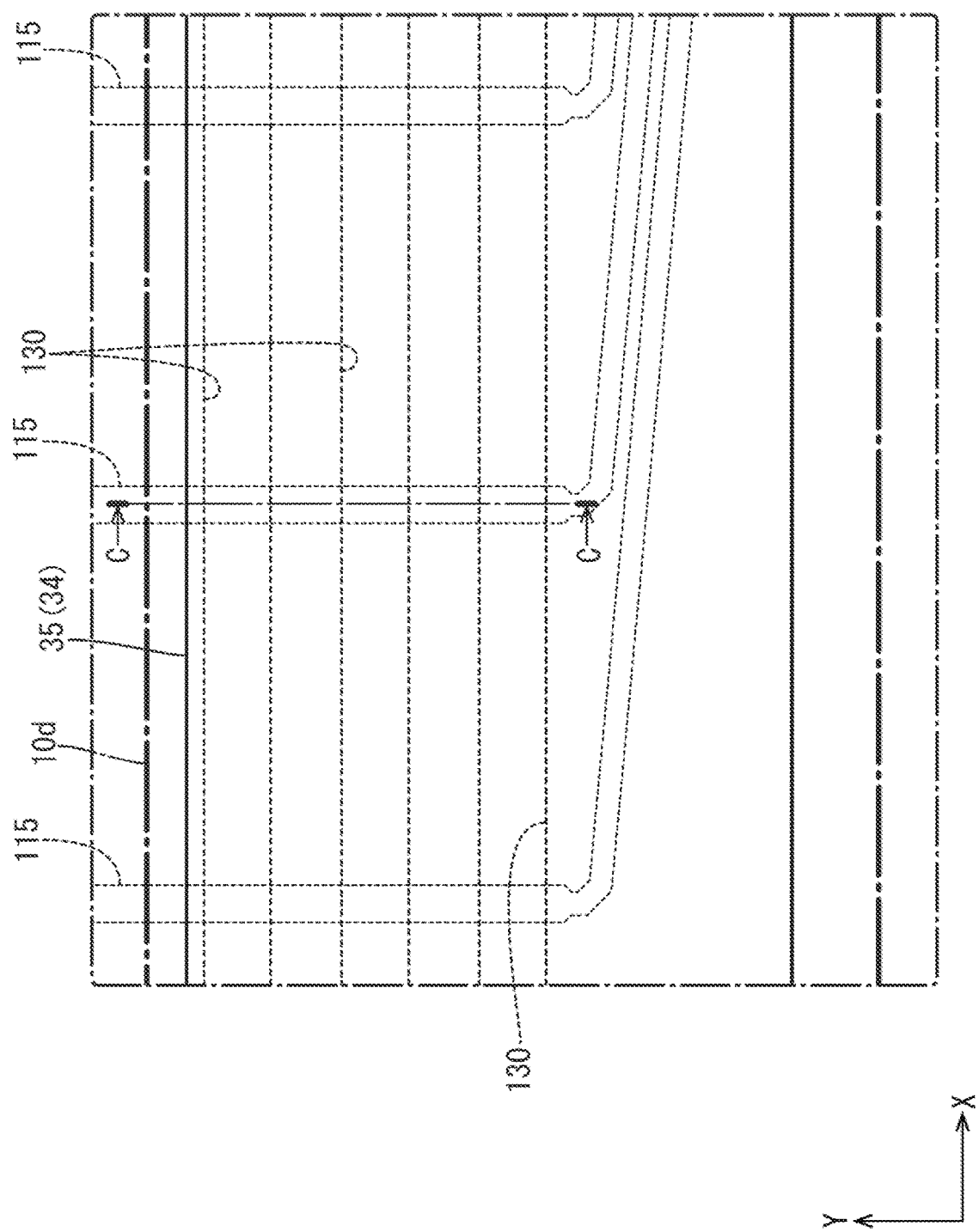

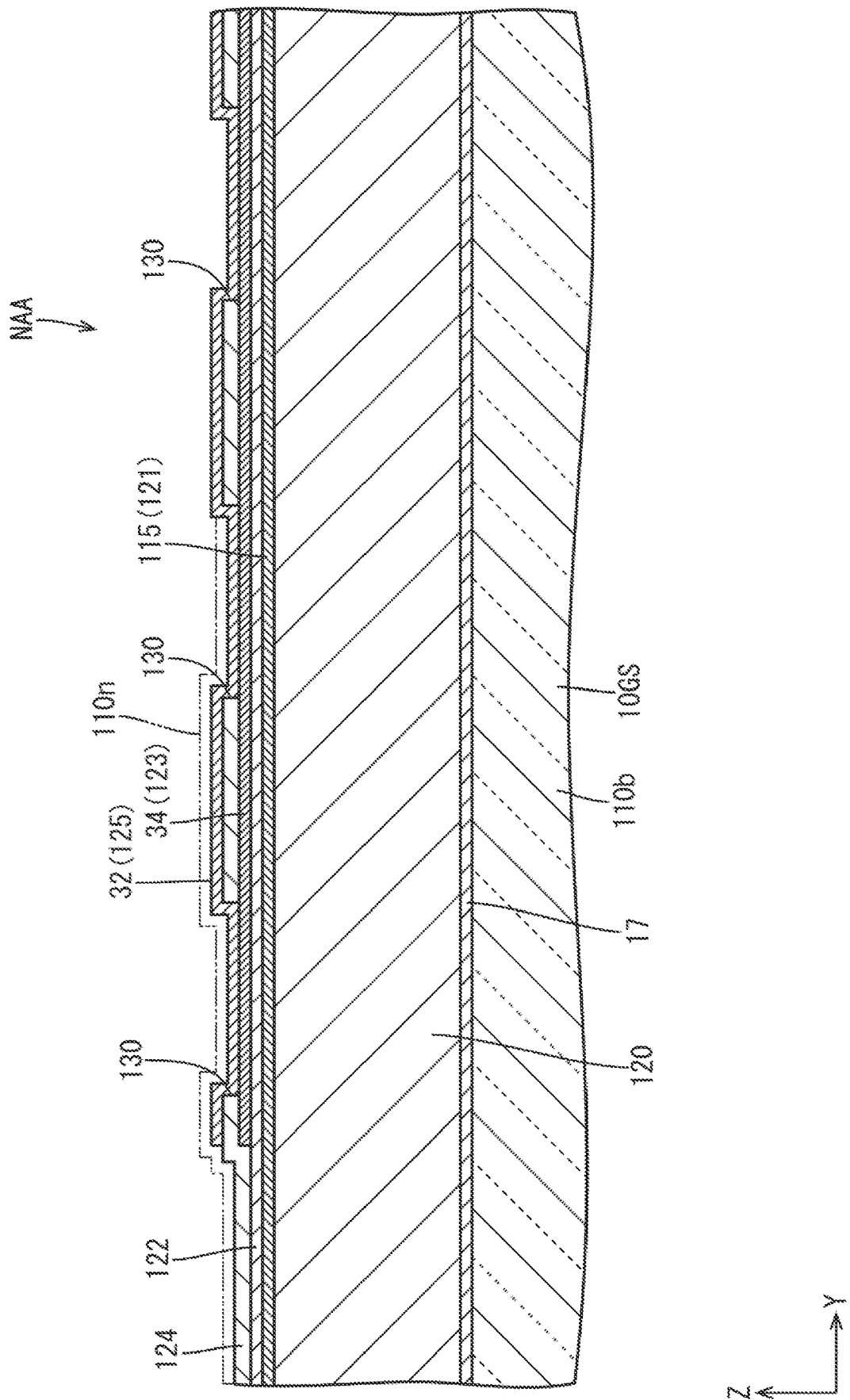

DISPLAY SUBSTRATE AND DISPLAY DEVICE

TECHNICAL FIELD

The present invention relates to a display substrate and a display device.

BACKGROUND ART

A display device with a built-in touchscreen panel described in Patent Document 1 is known as an example. The display device with the built-in touchscreen panel includes a touchscreen panel that is built in a display panel through the in-cell technology. The display device with the built-in touchscreen panel described in Patent Document 1 includes a panel, a touch integrated circuit, a data driver, and a gate driver. The panel includes data lines extending in a first direction, gate lines extending in a second direction, and electrodes grouped into multiple groups. The touch integrated circuit is configured to apply touch drive signals to all or some of the electrodes when a drive mode is in a touch driver mode. The data driver is configured to apply data voltages to the data lines when the drive mode is in a display drive mode. The gate driver is configured to supply scan signals to the gate lines in sequence when the drive mode is in the display drive mode. When the drive mode is in the touch drive mode, the touch drive signals or signals corresponding to the touch driver signals are applied to all or some of the gate lines.

RELATED ART DOCUMENT

Patent Document

Patent Document 1: Japanese Unexamined Patent Application Publication No. 2015-122057

Problem to be Solved by the Invention

In the display device with the built-in touch screen panel described in Patent Document 1, signal lines to which the touch drive signals related to touch detection are supplied are prepared from a metal film disposed in a layer that is upper than a first protective layer that is disposed in a layer that is upper than the data lines to which the data voltages related to image display are applied. In general, a liquid crystal display device including a liquid crystal, as in the display device with the built-in touchscreen panel, includes an alignment film for aligning orientation of liquid crystal molecules. The alignment film has high flowability during film formation and thus a groove for defining a film forming area may be formed in an insulator such as a first protective film. If such a groove is formed in the first protective layer described in Patent Document 1, flatness of the signal lines prepared from a metal film in a layer that is upper than the first protective layer may decrease resulting in broken lines.

DISCLOSURE OF THE PRESENT INVENTION

The present invention was made in view of the above circumstances. An object is to define a film forming area of an alignment film while flatness of lines is maintained.

Means for Solving the Problem

A display substrate according to the present invention includes a substrate, a first insulator, a metal film, a second insulator, an alignment film, a line, and film forming area defining recesses. The substrate includes a display area in which an image is displayed and a non-display area on an outer edge side to surround the display area. The first insulator is disposed to straddle the display area and the non-display area of the substrate. The metal film is disposed in a layer that is upper than the first insulator to straddle the display area and the non-display area of the substrate. The second insulator is disposed in a layer that is upper than the metal film to straddle the display area and the non-display area of the substrate. The second insulator has a thickness smaller than a thickness of the first insulator. The alignment film is disposed in a layer that is upper than the second insulator at least in the display area. The line extends to straddle the display area and the non-display area. The line includes a section of the metal film. The film forming area defining recess is provided in the non-display area to cross the line. The film forming area defining recesses include recessed sections of the second insulator to define a forming area of the alignment film.

In formation of the alignment film, a material of the alignment film having flowability is supplied to the display area of the substrate. The material flows and spread in the layer that is upper than the second insulator film on the substrate and the alignment film is formed at least in the display area. The material of the alignment film supplied to the display area may reach the non-display area. By defining the forming area of the alignment film with the film forming area defining recesses in the non-display area, the material of the alignment film is less likely to spread outer than the film forming area defining recesses in the non-display area. The film forming area defining recesses extend to cross the line and thus properly define the forming area of the alignment film with respect to the extending direction of the film forming area defining recesses whether or not the line is present.

Because the line that extend to straddle the display area and the non-display area of the substrate includes the section of the metal film disposed in the layer that is upper than the first insulator and having the thickness larger than the thickness of the second insulator, the flatness of the line is ensured. The film forming area defining recesses include the recessed sections of the second insulator disposed in the layer that is upper than the metal film and thus the film forming area defining recesses are less likely to affect the flatness of the line although the film forming area defining recesses extend to cross the line. Because the flatness of the line is ensured, comparison to the configuration in which the film forming area defining recesses that cross the line are formed in the first insulator, the line is less likely to have irregularity in thickness and thus less likely to have breaks. Furthermore, the second insulator in which the film forming area defining recesses are formed has the thickness smaller than the thickness of the first insulator and thus the second insulator is processes with higher accuracy. Therefore, the positions, the shape, and the areas of the formed film forming area defining recesses are more likely to be proper. The film forming area defining recesses are not formed in the first insulator having the larger thickness. This configuration is preferable for obtaining a proper level of moisture protection.

Preferred embodiments of the display substrate according to the present invention may have following configurations.
(1) The second insulator may include a lower second insulator disposed in a lower layer and an upper second insulator disposed in an upper layer. The film forming area defining recesses may include at least recessed sections of the upper second insulator. In this configuration, the film forming area defining recesses are formed in the upper second insulator disposed closer to the alignment film relative to the lower second insulator. In comparison to a configuration in which the film forming area defining recesses are formed only in the lower second insulator and the upper second insulator is disposed between the film forming area defining recesses and the alignment film, the film forming area defining function of the film forming area defining recesses is more directly exerted on the alignment film. Therefore, the forming area of the alignment film is more properly defined.

(2) The film forming area defining recesses may include lower film forming area defining recesses and upper film forming area defining recesses. The lower film forming area defining recesses may include recessed sections of the lower second insulator. The upper film forming area defining recesses may include recessed sections of the upper second insulator. In comparison to a configuration in which the film forming area defining recesses include only the upper film forming area defining recesses, the depth of the film forming area defining recesses is increased by the depth of the lower film forming area defining recesses formed in the lower second insulator. Therefore, the performance in definition of the film forming area to form the alignment film further improves.

(3) The lower film forming area defining recesses may include through holes in the lower second insulator. Sections of the first insulator overlapping the lower film forming area defining recesses but not the line may include secondary film forming area defining recesses that may extend parallel to the film forming area defining recesses and may define the forming area of the alignment film. The lower film forming area defining recesses that may include the through holes in the lower second insulator may be formed by etching the sections of the lower second insulator to form the lower film forming area defining recesses. The sections of the first insulator overlapping the lower film forming area defining recesses but not the line may be over-etched during the etching of the lower second insulator. As a result, the secondary film forming area defining recesses may be formed to extend parallel to the film forming area defining recesses. The depth of the secondary film forming area defining recesses is added to the depths of the lower film forming area defining recesses and the upper film forming area defining recesses. Therefore, the performance in definition of the film forming area to form the alignment film further improves.

(4) The lower film forming area defining recesses may include through holes in the lower second insulator and the upper film forming area defining recesses may include through holes in the upper second insulator. The display substrate may further include a first transparent electrode film, a second transparent electrode film, first line protectors, and second line protectors. The first transparent electrode film may be disposed between the lower second insulator and the upper second insulator. The second transparent electrode film may be disposed in a layer that is upper than the upper second insulator. The first line protectors may include sections of the first transparent electrode film to at least partially overlap the line and may be connected to the line via the lower film forming area defining recesses. The second line protectors may include sections of the second transparent electrode film to at least partially overlap the line and the first line protectors and may be connected to the first line protectors via the upper film forming area defining recesses. In this configuration, the lower film forming area defining recesses may include the through holes in the lower second insulator and the upper film forming area defining recesses may include the through holes in the upper second insulator. In comparison to a configuration in which the lower film forming area defining recesses and the upper film forming area defining recesses do not include the through holes, the film forming area defining recesses are provided with a larger depth. Therefore, the performance in definition of the film forming area to form the alignment film further improves. The first line protectors that may include the sections of the first transparent electrode film and the second line protectors that may include the sections of the second transparent electrode film may be disposed to overlap the line and connected to the line via the lower film forming area defining recesses and the upper film forming area defining recesses. This configuration can provide protection of the line and reduce the resistance of the line.

(5) The film forming area defining recesses may include recessed sections of the upper second insulator. Because the film forming area defining recesses are not formed in the first insulator and the lower second insulator, a higher level of the moisture protection is provided. Furthermore, the line may be covered with the lower second insulator that does not include the film forming area defining recesses. This configuration is preferable for protecting the line.

(6) The display substrate may further include a first transparent electrode film, a second transparent electrode film, first overlapping portion, and second overlapping portions. The first transparent electrode film may be disposed between the lower second insulator and the upper second insulator. The second transparent electrode film may be disposed in a layer that is upper than the upper second insulator. The first overlapping portions may include sections of the first transparent electrode film to at least partially overlap the film forming area defining recesses. The second overlapping portions may include sections of the second transparent electrode film to at least partially overlap the film forming area defining recesses. In this configuration, the first overlapping portions that include the sections of the first transparent electrode film and the second overlapping portions that include the sections of the second transparent electrode film are disposed to overlap the film forming area defining recesses in the upper second insulator. Therefore, a surface of the display substrate on which the alignment film is formed may include a step by the thicknesses of the first overlapping portion and the second overlapping portion. During the formation of the alignment film, a material of the alignment film spreading from the display area to the non-display area need to go over the step to reach the film forming area defining recesses. According to the configuration, performance in definition of the film forming area to form the alignment film further improves.

(7) The display substrate may further include a first transparent electrode film, a second transparent electrode film, and position detection electrodes. The first transparent electrode film may be disposed between the lower second insulator and the upper second insulator. The second transparent electrode film may be disposed in a layer that is upper than the upper second insulator. The position detection electrodes may include sections of the first transparent electrode film or the second transparent electrode film. The position detection electrodes may form a capacitor with a position input member by which a position input is performed to detect a positon of input by the position input member. The line may include a position detection line connected to the position detection electrodes. According to the configuration, the position detection electrodes form the capacitor with the position input member to perform the position input and the position of the input by the position input member can be detected using signals supplied through the position detection line. The position detection line, which is the line, is less likely to have breaks resulting from the film forming area defining recesses. Therefore, the position detection function is properly performed.

To solve the problem describe earlier, a display device according to the present invention includes the display substrate and an opposed substrate opposed to the display substrate with an internal space between the display substrate and the opposed substrate. In the display device having such a configuration, the line is less likely to have breaks resulting from the film forming area defining recesses. Therefore, a malfunction is less likely to occur.

Preferred embodiments of the display device according to the present invention may have following configurations.

(1) The display device may further include a sealant disposed between the display substrate and the opposed substrate in the non-display area to surround and seal the internal space. The film forming area defining recesses may be located at positions overlapping the sealant and closer to the internal space relative to an outer edge of the sealant. By defining the forming area of the alignment film with the film forming area defining recesses having such a configuration, the alignment film is less likely to reach at least the outer edge of the sealant. According to the configuration, a fixing strength of the sealant to the substrate is properly maintained and thus the substrates are less likely to be removed.

(2) The display device may further include a lower metal film and a lead. The lower metal film may be disposed in a layer that is lower than the first insulator. The lead may be disposed on an opposite side from the internal space relative to the sealant in the non-display area. The lead may include a section of the lower metal film and include a section overlapping the line. The first insulator may include a contact hole overlapping the line and the lead. According to the configuration, the line is connected to the lead including the section of the lower metal film via the contact hole in the first insulator. In comparison to a configuration in which the contact hole is located on an internal space side relative to the sealant, this configuration is preferable for improving definition and reducing the frame width because the lower metal film can be used for other lines in the internal space. A section of the metal film disposed in the layer that is upper than the first insulator may be configured as the line. Because the second insulator disposed in the layer that is upper than the metal film may include the film forming area defining recesses, the forming area of the alignment film is properly defined without a reduction in flatness of the line.

Advantageous Effect of the Invention

According to the present invention, the forming area of the alignment film is defined with the flatness of the line maintained.

BRIEF DESCRIPTION OF THE DRAWINGS

FIG. 1 is a cross-sectional view schematically illustrating a liquid crystal panel according to a first embodiment of the present invention.

FIG. 10 is a plan view illustrating film forming area defining recesses and touch lines disposed between a display area of an array substrate and a driver according to a second embodiment of the present invention.

FIG. 11 is a cross-sectional view along line C-C in FIG. 10.

MODES FOR CARRYING OUT THE INVENTION

First Embodiment

Figure 2:
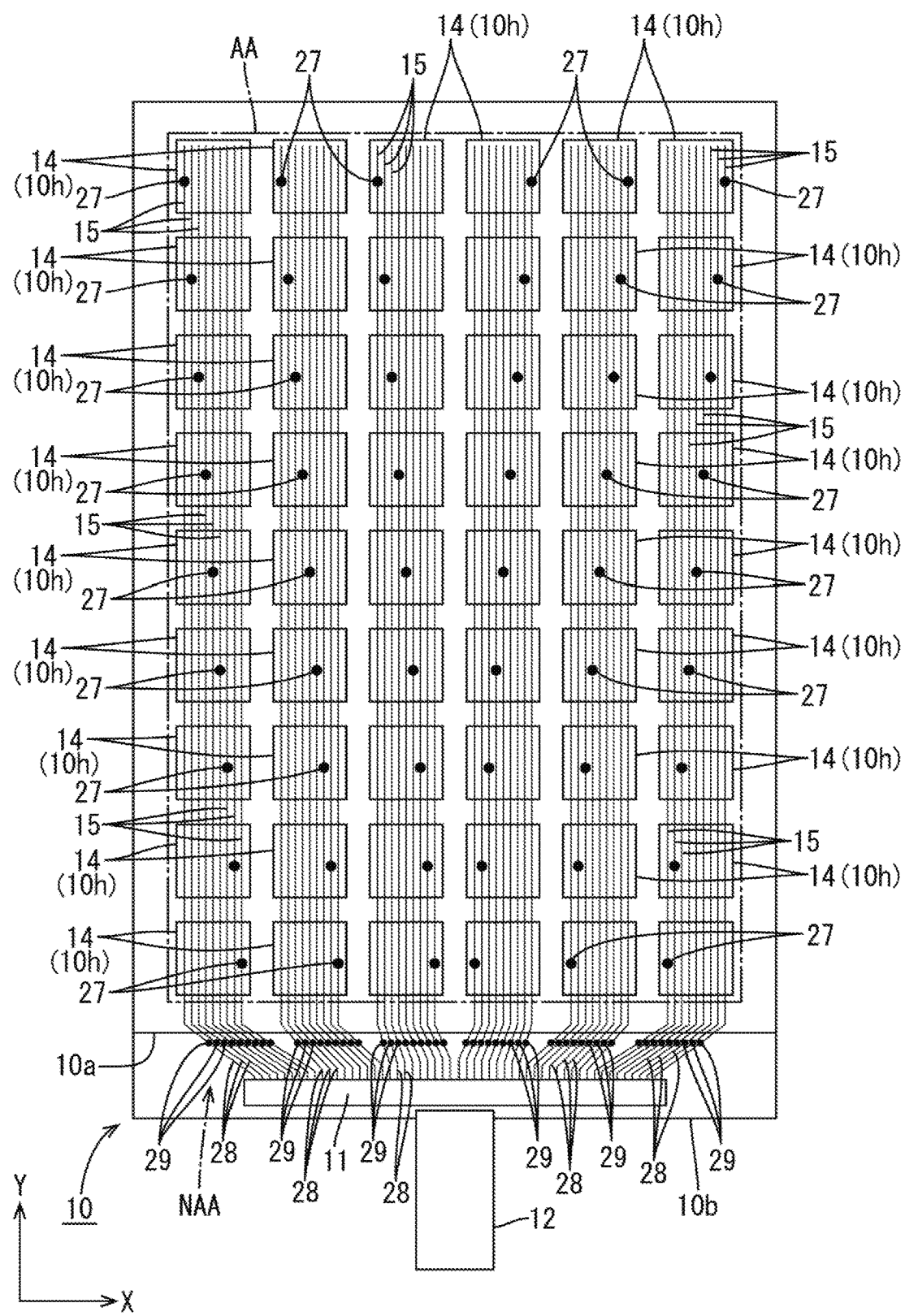
FIG. 2 is a plan view illustrating two-dimensional arrangement touch electrodes and touch lines in the liquid crystal panel included in a liquid crystal display device.

A first embodiment of the present invention will be described with reference to FIGS. 1 to 9. In this section, a liquid crystal panel 10 (a display device, a display device with a position input function) with a display function and a touch panel function (a position input function) will be described. X-axes, Y-axes, and Z-axes may be present in the drawings. The axes in each drawing correspond to the respective axes in other drawings. An upper side and a lower side in FIGS. 1, 4 and 7 to 9 correspond to a front side and a back side of the liquid crystal panel 10, respectively.

The liquid crystal panel 10 is configured to display images using illumination light supplied by a backlight unit (a lighting unit), which is not illustrated. As illustrated in FIG. 1, the liquid crystal panel 10 includes at least a pair of glass substrates 10*a* and 10*b*, a liquid crystal layer 10*c*, and a sealant 10*d*. The substrates 10*a* and 10*b* are substantially transparent and have high light transmissivity. The liquid crystal layer 10*c* is in an internal space 101S between plate surfaces of the substrates 10*a* and 10*b* that are opposed to each other. The liquid crystal layer 10*c* includes liquid crystal molecules that are substances having optical characteristics that vary according to application of electric fields. The sealant 10*d* is disposed between the substrates 10*a* and 10*b* to surround the internal space 101S (the liquid crystal layer 10*c*) and seal the internal space 101S and the liquid crystal layer 10*c*. One of the substrates 10*a* and 10*b* included in the liquid crystal panel 10 on the front side is a CF substrate 10*a* (an opposed substrate). The other one on the rear side (on the back side) is an array substrate 10*b* (a display substrate, an active matrix substrate). The CF substrate 10*a* and the array substrate 10*b* are prepared by forming various films on top of one another on inner surfaces of glass substrates 10GS (substrates). The sealant 10*d* is made of a light curing resin material such as an ultraviolet curing resin material. The sealant 10*d* has a frame shape to extend along outer edges of the CF substrate 10*a* (see FIG. 2). Polarizing plates are affixed to outer surfaces of the substrates 10*a* and 10*b*, respectively. In FIG. 2, a forming area of the sealant 10*d* is indicated by long dashed double-dotted line.

As illustrated in FIG. 2, an inner area of the liquid crystal panel 10 surrounded by the sealant 10*d* is configured as a display area AA in which images are displayed (an area defined by a chain line in FIG. 2). An outer area in a frame shape surrounding the display area AA is configured as a non-display area NAA in which the images are not displayed. The array substrate 10b included in the liquid crystal panel 10 is larger than the CF substrate 10a. A portion of the array substrate 10b projects from a side of the CF substrate 10a. In the projecting portion of the array substrate 10b (the non-display area NAA), a driver 11 (a driver circuit) and a flexible circuit board 12 (a signal transmitting portion) which are components for supplying various signals related to the display function and the touch panel function are mounted. The driver 11 is an LSI chip including a driver circuit therein and mounted in the projecting portion (at a position closer to the display area AA relative to the flexible circuit board 12), which is the non-display area NAA of the array substrate 10b, through the chip-on-glass (COG) technology. The driver 11 processes the various signals transmitted via the flexible circuit board 12. The flexible circuit board 12 includes a synthetic resin substrate (e.g., polyimide-based resin substrate) having insulating property and flexibility and multiple wirings (not illustrated) formed on the substrate. A first end of the flexible circuit board 12 is connected to the projecting portion of the array substrate 10b (at an end of the projecting portion with the driver 11 sandwiched between the display area AA and the end) and a second end of the flexible circuit board 12 is connected to a control circuit board (a signal source), which is not illustrated. The signals from the control circuit board are transmitted to the liquid crystal panel 10 via the flexible circuit board 12, processed by the driver 11 in the non-display area NAA, and output to the display area AA.

Figure 3:
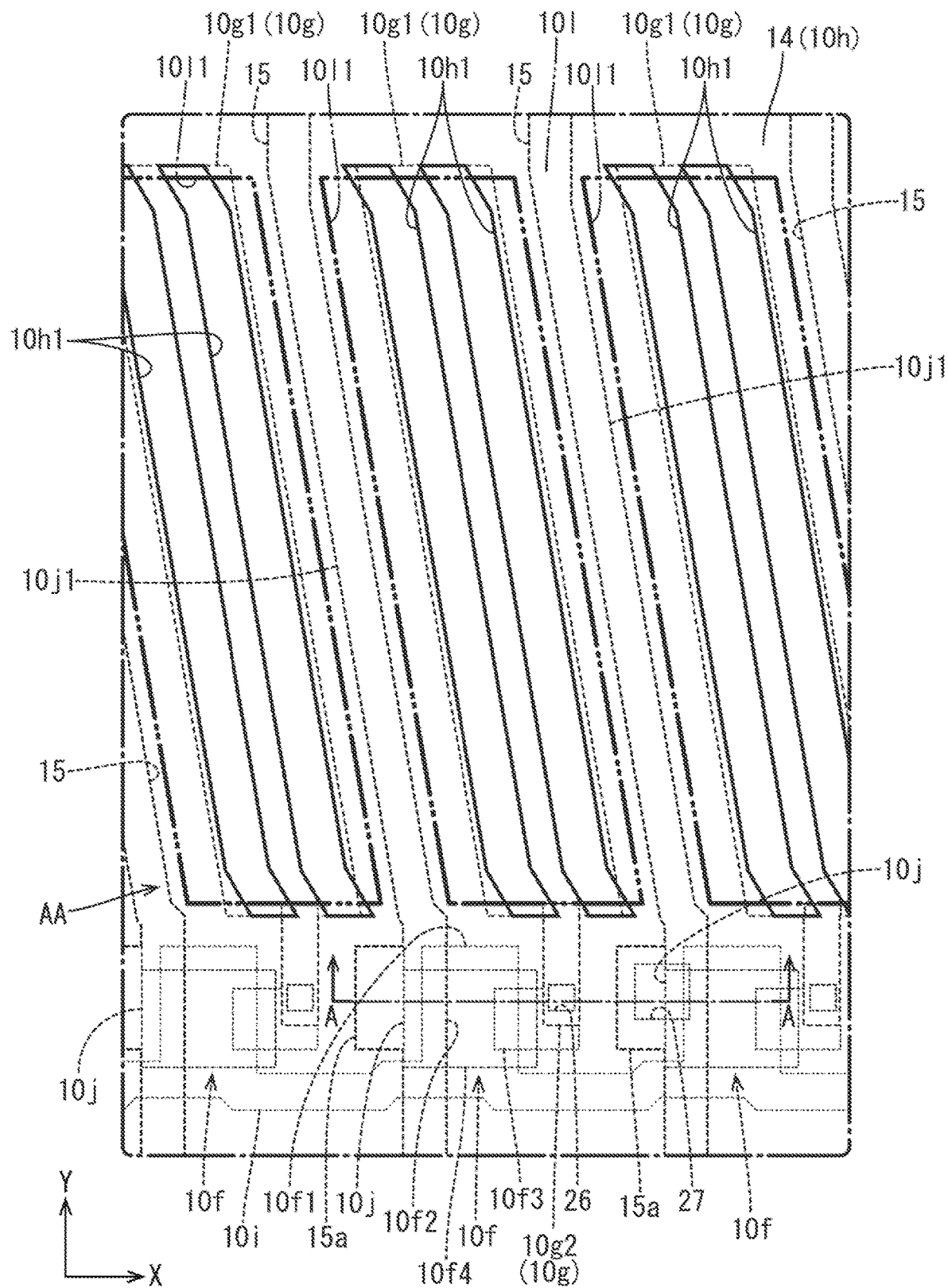
FIG. 3 is a plan view illustrating arrangement of pixels on an array substrate included in the liquid crystal panel.

As illustrated in FIG. 3, thin film transistors 10f (TFTs, switching components) and pixel electrodes 10g are arranged in a matrix along the X-axis direction and the Y-axis direction on an inner surface of the array substrate 10b (on a liquid crystal layer 10c side, on an opposed surface side opposed to the CF substrate 10a) in the display area AA. Gate lines 10i (scanning lines) and source lines 10j (signal lines, data lines) are routed in a grid to surround the TFTs 10f and the pixel electrodes 10g. The gate lines 10i extend in a direction substantially along the X-axis direction. The source lines 10j extend in a direction substantially along the Y-axis direction. The source lines 10j include diagonally extending sections 10j1 that extend in a diagonal direction relative to the X-axis direction and the Y-axis direction. The gate lines 10i are connected to gate electrodes 10f1 of the TFTs 10f. The source lines 10j are connected to source electrodes 10f2 of the TFTs 10f. The pixel electrodes 10g are connected to drain electrodes 10f3 of the TFTs 10f. The TFTs 10f are driven based on various signals supplied to the gate lines 10i and the source lines 10j. Through the driving of the TFTs 10f, application of voltages to the pixel electrodes 10g is controlled. Each of the pixel electrodes 10g has a vertically-long parallelogram shape in a plan view. The source lines 10j are disposed between the pixel electrodes 10g that are adjacent to each other in a short-side direction of the pixel electrodes 10g (the X-axis direction). The gate lines 10i are disposed between the pixel electrodes 10g that are adjacent to each other in a long-side direction of the pixel electrodes 10g (the Y-axis direction). The long sides of the pixel electrodes 10g are parallel to the diagonally-extending sections 10j1 of the source lines 10j.

Figure 4:
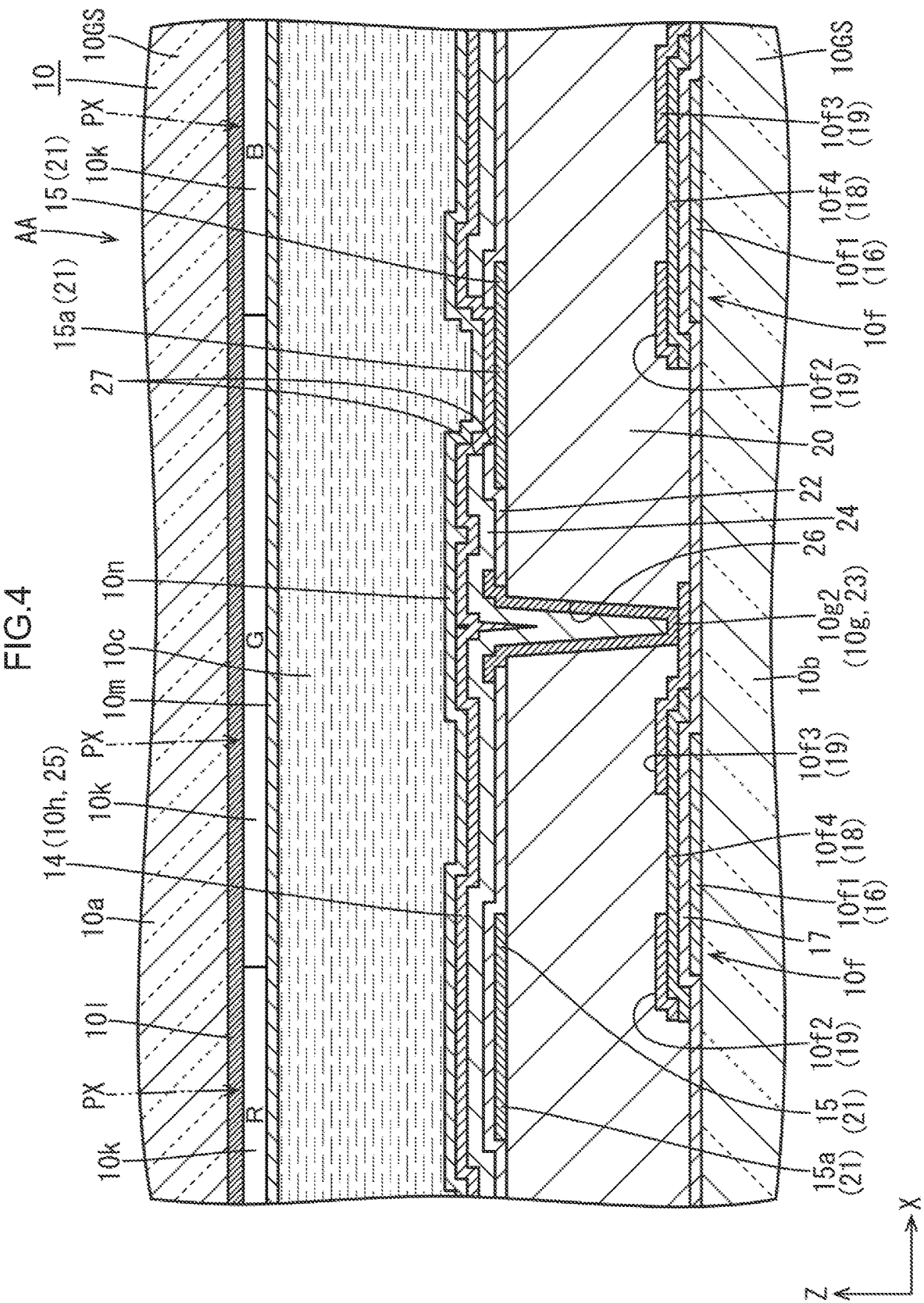
FIG. 4 is a cross-sectional view along line A-A in FIG. 3.

As illustrated in FIGS. 3 and 4, a common electrode 10h is disposed to overlap all pixel electrodes 10g on an upper layer side relative to the pixel electrodes 10g (closer to the liquid crystal layer 10c) in the display area AA on the inner surface of the array substrate 10b. The common electrode 10h spreads over substantially an entire area of the display area AA to apply a reference voltage that is normally about constant. The common electrode 10h includes pixel overlapping openings 10h1 (pixel overlapping slits, alignment control slits) formed in areas overlapping the corresponding pixel electrodes 10g. The pixel overlapping openings 10h1 extend along the diagonally-extending sections 10j1 (in a longitudinal direction of the pixel electrodes 10g). When potential differences are created between the pixel electrodes 10g and the common electrode 10h that overlap each other as the pixel electrodes 10g are charged, fringe electric fields (oblique electric fields) are generated between opening edges of the pixel overlapping openings 10h1 and the pixel electrodes 10g. The fringe electric fields include components parallel to the plate surface of the array substrate 10b and components normal to the plate surface of the array substrate 10b. With the fringe electric fields, orientations of the liquid crystal molecules included in the liquid crystal layer 10c can be controlled. Namely, the liquid crystal panel 10 according to this embodiment operates in fringe field switching (FFS) mode.

As illustrated in FIG. 4, color filters 10k that exhibit three different colors of red (R), green (G), and blue (B) are disposed on the inner surface side of the CF substrate 10a in the display area AA. The color filters 10k that exhibit different colors are repeatedly arranged along the gate lines 10i (in the X-axis direction). The color filters 10k extend along the source lines 10j (substantially the Y-axis direction). Namely, the color filters 10k are arranged in a stripe as a whole. The color filters 10k are arranged to overlap the pixel electrodes 10g on the array substrate 10b in a plan view. The color filters 10k that are adjacent to each other in the X-axis direction and exhibit different colors are arranged such that boundaries therebetween (color boundaries) overlap the source lines 10j and a light blocking portion 10l. In the liquid crystal panel 10, the R, the G, and the B color filters 10k that are arranged along the X-axis direction and three pixel electrodes 10g opposed to the respective color filters 10k compose three colors of pixels PX. In the liquid crystal panel 10, the R, the G, and the B pixels PX that are adjacent to one another in the X-axis direction form a display pixel configured to perform color display in predefined tones. An interval of the pixels PX in the X-axis direction is several tens of μm.

As illustrated in FIGS. 3 and 4, the light blocking portion 10l (an inter-pixel light blocking portion, a black matrix) configured to block light is disposed on the inner surface side of the CF substrate 10a in the display area AA. The light blocking portion 10l is formed in a grid pattern in a plan view to separate the adjacent pixels PX (the pixel electrodes 10g). The light blocking portion 10l includes pixel openings 10l1 at positions overlapping large areas of the pixel electrodes 10g on the array substrate 10b side in a plan view. The pixel openings 10l1 are arranged in a matrix along the X-axis direction and the Y-axis direction within the plate surface of the CF substrate 10a. Each pixel opening 10l1 has a vertically-long parallelogram shape in the plan view along an outline of the pixel electrode 10g. The pixel openings 10l1 pass light therethrough for display at the pixels PX. The light blocking portion 10l restricts light from traveling between the adjacent pixels PX to ensure independency of tones of each pixel PX. Especially, sections of the light blocking portion 10l extending along the source lines 10j reduce color mixture between the pixels PX that exhibit different colors. The light blocking portion 10l is disposed to overlap the gate lines 10i and the source lines 10j on the array substrate 10b in a plan view.

As illustrated in FIG. 4, alignment films 10m and 10n are disposed on the innermost surfaces of the substrates 10a and 10b that contact the liquid crystal layer 10c, respectively. The alignment films 10m and 10n are for aligning the orientation of the liquid crystal molecules in the liquid crystal layer 10c. The alignment films 10m and 10n may be made of polyimide. The alignment films 10m and 10n are formed in solid patterns in at least about entire display areas AA of the substrates 10a and 10b. The alignment films 10m and 10n are photo-alignment films that are capable of aligning the orientation of the liquid crystal molecules along a travelling direction of rays of light in a specific wavelength region (e.g., ultraviolet rays) when irradiated with the rays of light. A planarization film may be disposed between the alignment film 10m and the color filters 10k on the CF substrate 10a.

The liquid crystal panel 10 according to this embodiment has a display function for displaying images and a touch panel function (a position input function) for detecting positions of input by a user based on displayed images (input positions). The liquid crystal panel 10 includes an integrated touch panel pattern (with an in-cell technology) for exerting the touch panel function. The touch panel pattern uses a projection type electrostatic capacitance method and performs detection using a self-capacitance method. As illustrated in FIG. 2, the touch panel pattern includes touch electrodes 14 (position detection electrodes) disposed on the array substrate 10b of the substrates 10a and 10b and arranged in a matrix within the plate surface of the array substrate 10b. The touch electrodes 14 are disposed in the display area AA of the array substrate 10b. The display area AA of the liquid crystal panel 10 substantially corresponds with a touch area in which input positions are detectable (a position input area). The non-display area NAA substantially corresponds with a non-touch area in which input positions are not detectable (a non-position input area). When the user intends to input a position based on a displayed image in the display area AA of the liquid crystal panel 10 recognized by the user and brings his or her finger (a position input body), which is a conductive member but not illustrated, closer to the surface of the liquid crystal panel 10 (a display surface), the finger and the touch electrode 14 form a capacitor. A capacitance measured at the touch electrode 14 close to the finger changes as the finger approaches to the touch electrode 14. The capacitance at the touch electrode 14 is different from the capacitance at the touch electrodes 14 farther from the finger. Based on the difference, the input position can be detected.

As illustrated in FIG. 2, the touch electrodes 14 are constructed from the common electrode 10h on the array substrate 10b. The common electrode 10h includes the touch electrodes 14 that are separated from one another to be arranged in a grid and electrically independent from one another. The touch electrodes 14 that are provided by dividing the common electrode 10h are arranged in a matrix including lines of the touch electrodes 14 along the X-axis direction and the Y-axis direction in the display area AA. Each touch electrode 14 has a substantially square shape in a plan view with about some millimeters (e.g., two to five millimeters) of edges. Each touch electrode 14 is significantly larger than the pixel PX (or the pixel electrode 10g) in the plan view. Each touch electrode 14 is disposed in an area that covers multiple (e.g., several tens or hundreds of) pixels PX with respect to the X-axis direction and the Y-axis direction. Multiple touch lines 15 (the position detection lines) on the array substrate 10b are selectively connected to the touch electrodes 14. The touch lines 15 extend parallel to the source lines 10j and substantially along the Y-axis direction. The touch lines 15 are connected to specific ones of the touch electrodes 14 that are arranged along the Y-axis direction. The touch lines 15 are connected to a detection circuit that is not illustrated. The detection circuit may be included in the driver 11 or may be provided outside the liquid crystal panel 10 and connected via the flexible circuit board 12. The touch lines 15 supply reference voltage signals related to the image display function and touch signals (position detection signals) related to the touch function to the touch electrodes 14 at different timing. When the reference voltage signals are transmitted to all the touch lines 15 at the same time, all the touch electrodes 14 are at the reference potential and function as the common electrode 10h. FIG. 2 schematically illustrates the arrangement of the touch electrodes 14. The number, the arrangement, and the two-dimensional shape of the touch electrodes 14 may be altered from those in the drawings where appropriate.

Films stacked on top of one another on the inner surface of the array substrate 10b will be described. As illustrated in FIG. 4, on the glass substrate 10GS of the array substrate 10b, a first metal film 16 (a lower metal film, a gate metal film), a gate insulator 17, a semiconductor film 18, a second metal film 19 (a lower metal film, a source metal film), a planarization film 20 (a first insulator, an organic insulator), a third metal film 21 (a metal film), a lower interlayer insulator 22 (a second insulator, a second lower insulator), a first transparent electrode film 23, an upper interlayer insulator 24 (a second insulator, a second upper insulator), and second transparent electrode film 25 (a transparent electrode film) are disposed on top of one another in this sequence from a lower layer side (on a glass substrate 10GS side).

Each of the first metal film 16, the second metal film 19, and the third metal film 21 is a single layer film made of one kind of metal selected from copper, titanium, aluminum, molybdenum, and tungsten. Alternatively, each of the first metal film 16, the second metal film 19, and the third metal film 21 is a laminated film made of different kinds of metals or alloy. The first metal film 16, the second metal film 19, and the third metal film 21 have conductivity and light blocking properties. The gate lines 10i and the gate electrodes 10f1 of the TFTs 10f are sections of the first metal film 16. The source lines 10j, the touch lines 15, and the source electrodes 10f2 and the drain electrodes 10f3 of the TFTs 10f are sections of the second metal film 19. The touch lines 15 are sections of the third metal film 21. The gate insulator 17, the lower interlayer insulator 22, and the upper interlayer insulator 24 are made of non-organic material such as silicon nitride ($SiN_x$) and silicon oxide ($SiO_2$). The gate insulator 17 insulates the metal films 19 and 21 and the transparent electrode films 23 and 25 on the upper layer side from the metal films 16, 19 and 21 and the first transparent electrode film 23 on the lower layer side. The insulators 17, 22 and 24 made of the inorganic materials are disposed to straddle the display area AA and the non-display area NAA. The thicknesses of the insulators 17, 22 and 24 made of the inorganic materials are smaller than the thickness of the planarization film 20, which will be described next. It is preferable to set the thicknesses in a range from 0.2 μm to 0.3 μm. However, the thicknesses may be set in a different range. The planarization film 20 is made of an organic material such as an acrylic resin (e.g., PMMA). The planarization film 20 is provided for compensating differences in height created on a lower layer side relative to the planarization film 20. The planarization film 20 has a thickness larger than the thicknesses of the insulators 17, 22 and 24 made of the inorganic materials. It is preferable to set the thickness of the planarization film 20 in a range from 1.5 µm to 3 µm. However, the thickness may be set in a different range. The semiconductor film 18 is a thin film made of an oxide semiconductor. Channels 10/4 (semiconductor portions) connected to the source electrodes 10/2 and the drain electrodes 10/3 are sections of the semiconductor film 18. The oxide semiconductor to form the semiconductor film 18 may be an amorphous oxide semiconductor. Alternately, the oxide semiconductor may be a crystalline oxide semiconductor including a crystalline portion (e.g., a polycrystalline oxide semiconductor, a microcrystalline oxide semiconductor, a crystalline oxide semiconductor with a c-axis substantially perpendicular to a layer surface). The oxide semiconductor may have a single-layer structure or a multilayer structure. The oxide semiconductor to form the semiconductor film may be an indium gallium zinc oxide (In—Ga—Zn—O) based semiconductor. The first transparent electrode film 23 and the second transparent electrode film 25 are made of transparent electrode materials (e.g., indium tin oxide (ITO), indium zinc oxide (IZO)) and disposed to straddle the display area AA and the non-display area NAA. The pixel electrodes 10g are sections of the first transparent electrode film 23. The common electrode 10h (the touch electrodes 14) is a section of the second transparent electrode film 25.

The configurations of the TFTs 10f and the pixel electrodes 10g will be described in detail. As illustrated in FIGS. 3 and 4, the TFTs f include the gate electrodes 10/1 that are branched off from the gate lines 10i that are prepared from the first metal film 16. The gate electrodes 10/1 are portions of the gate lines 10i crossing the source lines 10j. The portions project toward the pixel electrodes 10g to which the gate electrodes 10/1 are to be connected along the Y-axis direction. Each of the gate electrodes 10/1 has a substantially square shape in the plan view. The TFTs 10f include the source electrodes 10/2 that are portions of the source lines 10j that is prepared from the second metal film 19 overlapping the gate electrodes 10/1. The source electrodes 10/2 are the portions of the source lines 10j extending in substantially straight lines along the Y-axis direction. The TFTs 10f include the drain electrodes 10/3 that are prepared from the second metal film 19 and separated from the source electrodes 10/2 with gaps. Each of the drain electrodes 10/3 has a substantially L shape in the plan view. First ends of the drain electrodes 10/3 are opposed to the source electrodes 10/2 and connected to the channels 10/4. Second ends of the drain electrodes 10/3 are connected to the pixel electrodes 10g.

As illustrated in FIGS. 3 and 4, the pixel electrodes 10g prepared from the first transparent electrode film 23 include pixel electrode bodies 10g1 and contacts 10g2. Each of the pixel electrode bodies 10g1 has a substantially parallelogram shape. The contacts 10g2 project from the pixel electrode bodies 10g1 toward the TFTs 10f along the Y-axis direction. The contacts 10g2 are connected to the drain electrodes 10/3. The contacts 10g2 prepared from the first transparent electrode film 23 and the drain electrodes 10/3 partially overlap each other. The overlapping sections of the contacts 10g2 and the drain electrodes 10/3 are connected to each other via pixel contact holes 26 drilled through the planarization film 20 and the lower interlayer insulator 22 disposed therebetween. The TFTs 10f include the channels 10/4 that overlap the gate electrodes 10/1 via the gate insulator 17. The channels 10/4 are prepared from the semiconductor film 18 and connected to the source electrodes 10/2 and the drain electrodes 10/3. The channels 10/4 extend in the X-axis direction to cross the gate electrodes 10/1. The first ends of the channels 10/4 are connected to the source electrodes 10/2 and the second ends of the channels 10/4 are connected to the drain electrodes 10/3. When the TFTs 10f are tuned on based on the scan signals supplied to the gate electrodes 10/1 via the gate lines 10i, potentials related to the image signals supplied to the source lines 10j are supplied from the source electrodes 10/2 to the drain electrodes 10/3 via the channels 10/4 to charge the pixel electrodes 10g. The semiconductor film 18 to form the channels 10/4 of the TFTs 10f is made of the oxide semiconductor having electron mobility higher than that of the amorphous silicon thin film. The TFTs 10f are "oxide semiconductor TFTs (IGZO-TFTs)." The TFTs 10f has a reduced size and advantages in improvement of definition and aperture ratio. Furthermore, turn-off characteristics of the TFTs 10f are high and thus a leak current can be reduced. The TFTs 10f have an advantage in reduction of power consumption. In comparison to the amorphous silicon, the electron mobility of the oxide semiconductor of the semiconductor film 18 is about 20 to 50 times higher than that of the amorphous silicon thin film and the leak current is about one hundredth, which is significantly smaller.

Next, the touch lines 15 will be described in detail. As illustrated in FIGS. 3 and 4, the touch lines 15 prepared from the third metal film 21 are connected to the corresponding touch electrodes 14 prepared from the second transparent electrode film 25 via touch electrode contact holes 27 in an internal space 10IS and the display area AA (inside the sealant 10d). The touch electrode contact holes 27 are drilled through the lower interlayer insulator 22 and the upper interlayer insulator 24. The touch lines 15 include wide sections adjacent to the TFTs 10f (the drain electrodes 10/3) in the X-axis direction. Wide sections 15a function as connecting pads for the touch electrodes 14. The wide sections 15a are the sections of the touch lines 15 that cross the TFTs 10f arranged in lines along the Y-axis direction at positions adjacent to the TFTs 10f. The touch electrode contact holes 27 are arranged to overlap some of (or one of) the wide sections 15a. Because the wide sections 15a are provided for the TFTs 10f (the pixel electrodes 10g), respectively, parasitic capacitances between the touch lines 15 and the TFTs 10f or the pixel electrodes 10g can be equalized. The touch lines 15 extend substantially along the Y-axis direction to cross all the touch electrodes. However, the touch lines 15 are connected to the specific touch electrodes 14 according to the two-dimensional arrangement of the touch electrode contact holes 27. The touch lines 15 are disposed to overlap the source lines 10j in the plan view.

Figure 5:
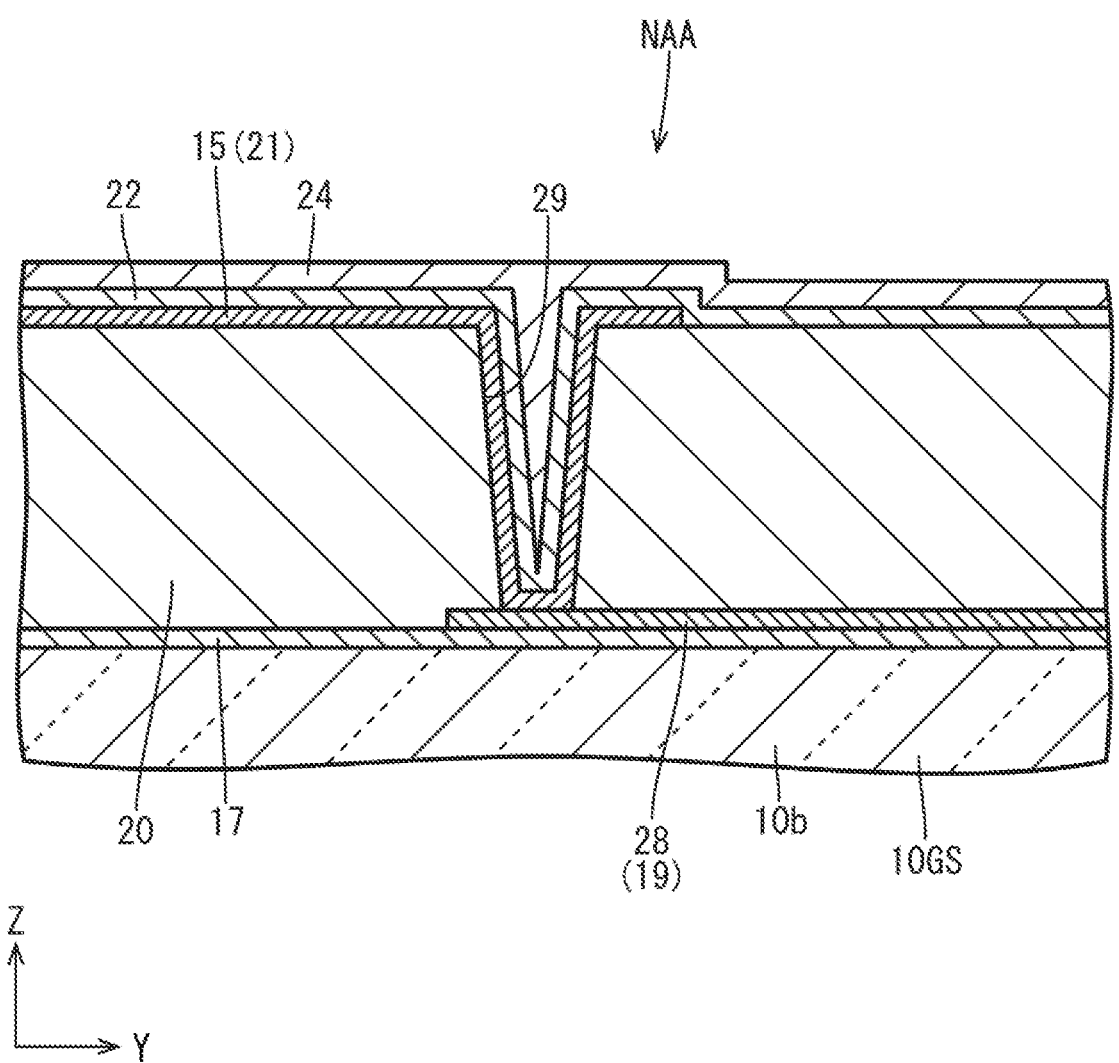
FIG. 5 is a cross-sectional view illustrating a connection between the touch line and a touch lead line on the array substrate.

As illustrated in FIG. 2, the touch lines 15 are routed to spread in a fan shape in the non-display area NAA outside the internal space 10IS (outer than the sealant 10d). Leading ends of the touch lines 15 are connected to touch leads 28. The touch leads 28 are routed to spread in a fan shape parallel to the touch lines 15. First ends of the touch leads 28 are connected to the touch lines 15 and second ends of the touch leads 28 are connected to the driver 11. As illustrated in FIG. 5, the first ends of the touch lines 28 prepared from the second metal film 19 overlap the leading ends of the touch lines 15 prepared from the third metal film 21. The first ends and ding ends overlapping each other are connected to each other via contact holes 29 drilled through the planarization film 20 disposed therebetween. The second ends of the touch leads 28 include terminals connected to the driver 11. Similar to the touch lines 15, the source lines 10j are connected to the driver 11 via source leads that may be prepared from the first metal film 16.

Figure 6:
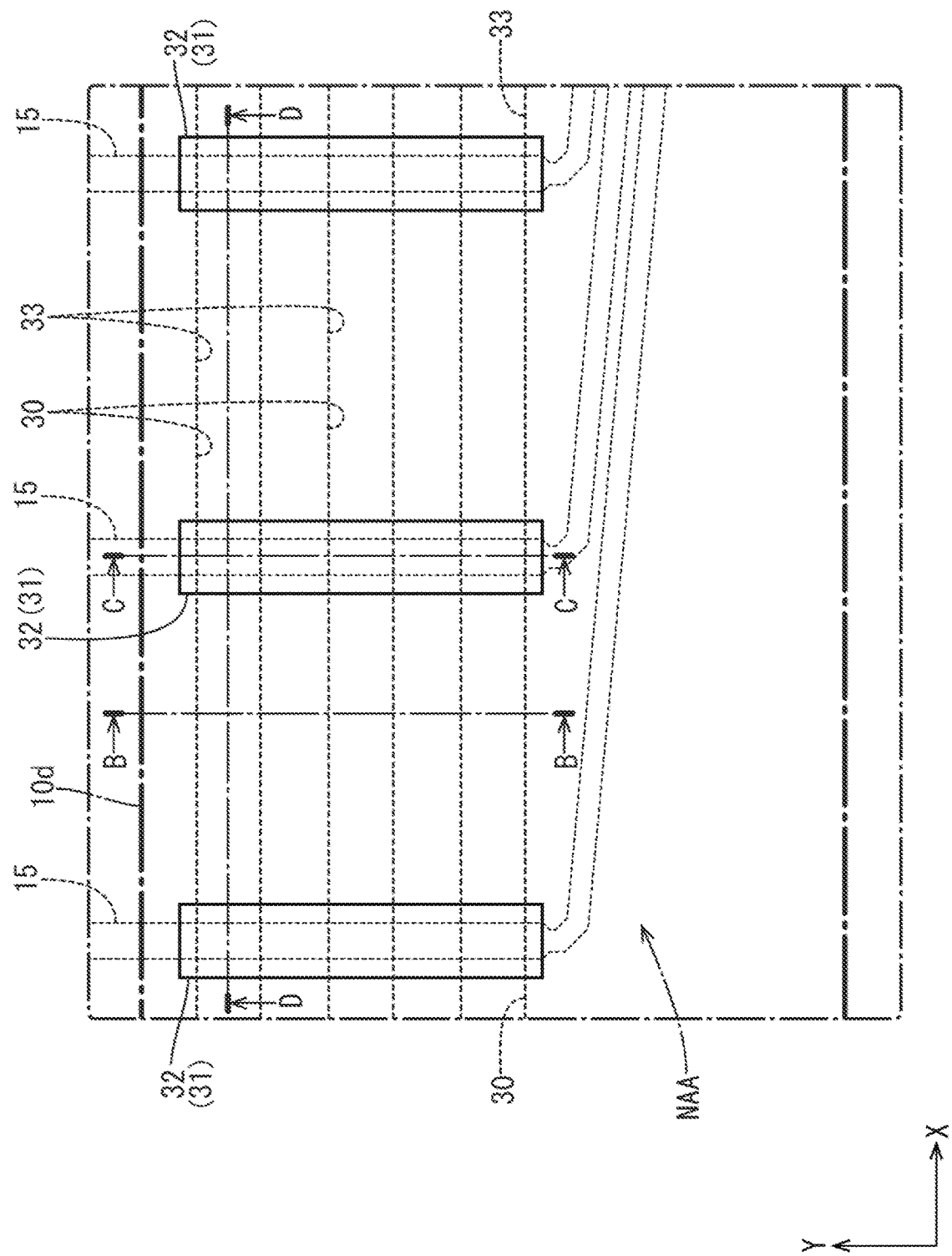
FIG. 6 is a plan view illustrating film forming area defining recesses and the touch lines disposed between a display area of the array substrate and a driver.
Figure 7:
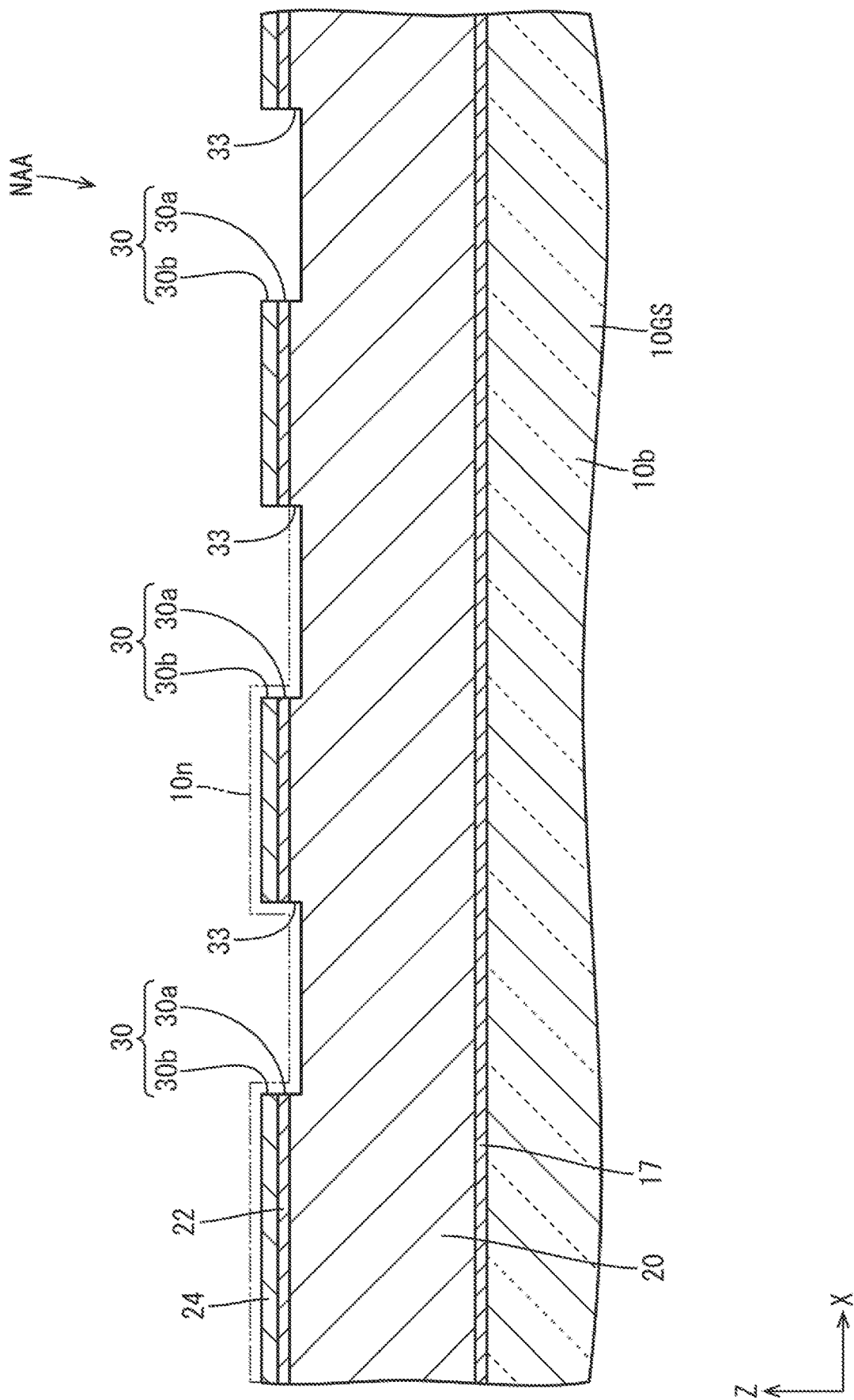
FIG. 7 is a cross-sectional view along line B-B in FIG. 6.
Figure 8:
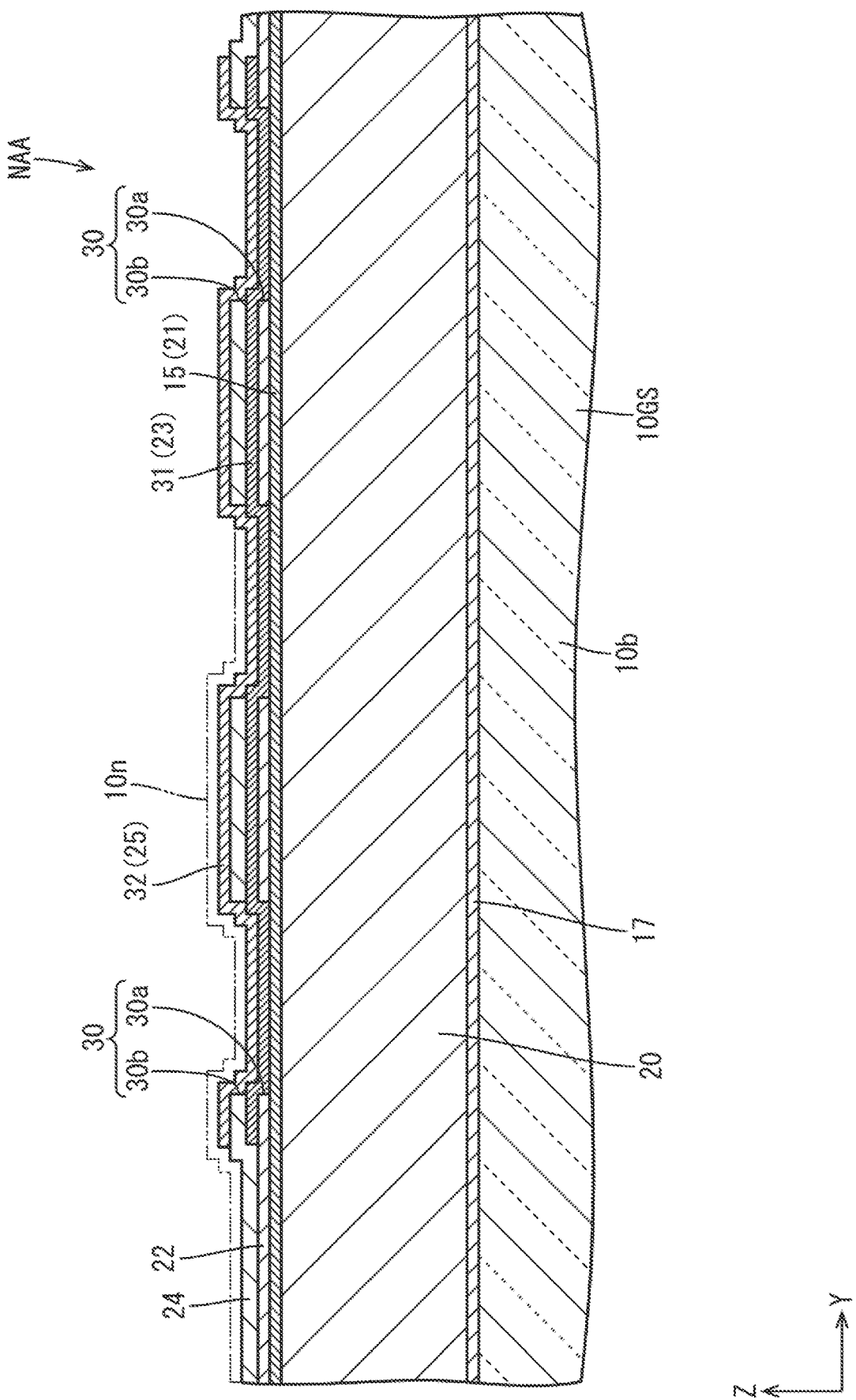
FIG. 8 is a cross-sectional view along line C-C in FIG. 6.
Figure 9:
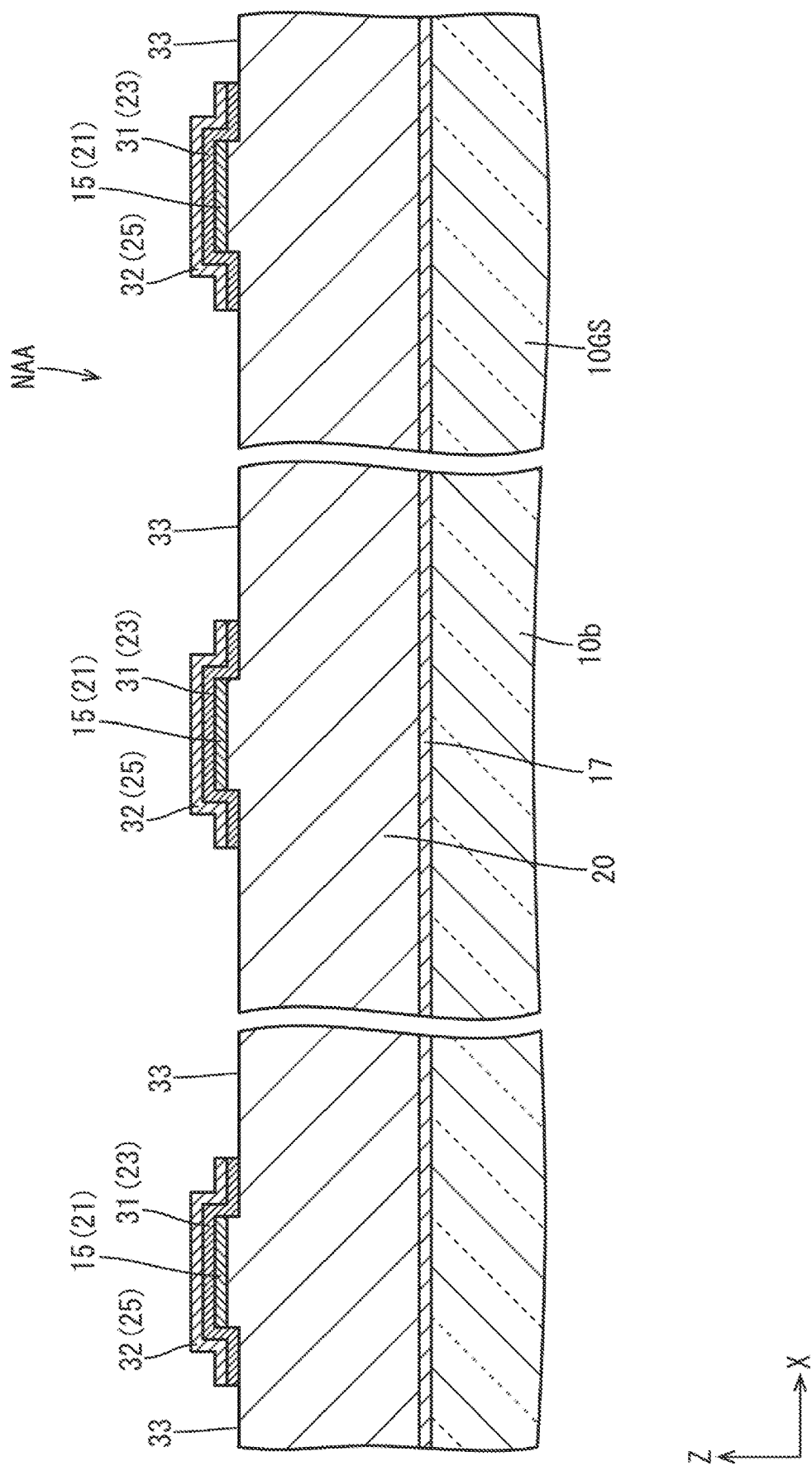
FIG. 9 is a cross-sectional view along line D-D in FIG. 6.

As illustrated in FIGS. 6 to 8, film forming area defining recesses 30 are provided in the non-display area NAA of the array substrate 10b to define an area in which the alignment film 10n is formed. The film forming area defining recesses 30 are formed by recessing sections of the lower interlayer insulator 22 and the upper interlayer insulator 24 disposed in layers that are upper than third metal film 21 from which the touch lines 15 are prepared. The film forming area defining recesses 30 are parallel to four edges of the display area AA having a rectangular shape in the plan view. The film forming area defining recesses 30 form a frame shape along outlines of the display area AA and the sealant 10d as a whole (see FIG. 2). The film forming area defining recesses 30 between the display area AA and the driver 11 among the film forming area defining recesses 30 along the four edges linearly extend in a direction along short sides of the display area AA and the sealant 10d (the X-axis direction, a direction crossing (or perpendicular) to a direction in which the lines extend) to cross the touch lines 15. The film forming area defining recesses 30 between the display area AA and the driver 11 will be described in detail. In FIG. 6, the upper side is the display area AA side and the lower side is the driver 11 side. In FIGS. 6, 8 and 9, the source lines 10j are not illustrated.

As illustrated in FIGS. 6 and 7, the film forming area defining recesses 30 between the display area AA and the driver 11 are arranged such that every three of them are parallel to one another and separated from one another in the Y-axis direction. All three of the film forming area defining recesses 30 arranged in the Y-axis direction overlap the sealant 10d in the plan view. One of the film forming area defining recesses 30 the farthest from the display area AA, that is, the outermost one of the film forming area defining recesses 30 is located at about the middle of the sealant 10d in a width direction of the sealant 10d. The three film forming area defining recesses 30 arranged in the Y-axis direction are all located outer than the outer edge of the sealant 10d. The film forming area defining recesses 30 include holes that are drilled (open) through the lower interlayer insulator 22 and the upper interlayer insulator 24 in a thickness direction of the lower interlayer insulator 22 and the upper interlayer insulator 24, respectively.

During the formation of the alignment film 10n on the array substrate 10b, a material of the alignment film 10n having flowability is supplied to the display area AA on the glass substrate 10GS. The material spreads over the innermost surface (in a layer that is upper than the upper interlayer insulator 24 on the glass substrate GS). As a result, the alignment film 10n is formed in at least an about entire area of the display area AA. Specifically, the material of the alignment film 10n is applied to the array substrate 10b using an inkjet device, for example. The application is performed by intermittently injecting liquid drops of the material of the alignment film 10n from a nozzle of the inkjet device onto the second transparent electrode film 25 in the display area AA. The liquid drops of the material of the alignment film 10n in the display area AA flow from landing points and spread over surfaces of the upper interlayer insulator 24 and the second transparent electrode film 25 to wet them. At least some of the liquid drops spread from the display area AA to the non-display area NAA. As illustrated in FIGS. 7 and 8, the material of the alignment film 10n reaches target positions at which the sealant 10d is to be formed in the non-display area NAA and flows into the film forming area defining recesses 30 at the target positions. The film forming areas are defined. The film forming area defining recesses 30 are arranged such that every three of them are arranged parallel to and separated from one another. If the material of the alignment film 10n flows over the film forming area defining recess 30 the closest to the display area AA, the material is less likely to flow over at least the film forming area defining recess 30 the farthest from the display area AA (at the outermost position) of remaining two of them. Therefore, the material of the alignment film 10n is less likely to spread outer than each film forming area defining recess 30 in the non-display area NAA. Sections of the sealant outer than the outermost film forming area defining recesses 30 (including the outer edges) are less likely to overlap the alignment film 10n. A reduction in adhesiveness (fixing strength) of the sealant 10d to the array substrate 10b is less likely to occur and thus the substrates 10a and 10b are less likely to be removed. The film forming area defining recesses 30 extend to cross the touch lines 15. Sections of the film forming area defining recesses 30 overlap the touch lines 15 and sections of the film forming area defining recesses 30 do not overlap the touch lines 15 are coupled to each other. According to the configuration, the film forming area defining recesses 30 properly define the forming area of the alignment film 10n with respect to the extending direction of the film forming area defining recesses 30 (the X-axis direction) whether or not the touch lines 15. In FIGS. 7 and 8, the alignment film 10n is indicated by long dashed double-dotted lines and the film forming area of the alignment film 10n is defined by the film forming area defining recesses 30 in the middle. Such a configuration may be altered.

As illustrated in FIG. 8, the touch lines 15 that extend to straddle the display area AA and the non-display area NAA of the glass substrate 10GS include the sections of the third metal film 21 disposed in the layer that is upper than the planarization film 20. The thickness of the planarization film 20 is larger than the thicknesses of the lower interlayer insulator 22 and the upper interlayer insulator 24. Therefore, the touch lines 15 have flatness. The film forming area defining recesses 30 are prepared by recessing the sections of the lower interlayer insulator 22 and the upper interlayer insulator 24 in the Y-axis direction. Although the film forming area defining recesses 30 extend in the X-axis direction to cross the touch lines 15 and include the sections that overlap the touch lines 15, the film forming area defining recesses 30 are less likely to affect the flatness of the touch lines 15. In comparison to a configuration in which the film forming area defining recesses are formed in the planarization film 20 to cross the touch lines 15, the touch lines 15 are less likely to have irregularities in thickness and thus less likely to have the breaks. Therefore, the position detection function is properly performed. The lower interlayer insulator 22 and the upper interlayer insulator 24 that include the film forming area defining recesses 30 have the thicknesses smaller than the thickness of the planarization film 20. Therefore, the lower interlayer insulator 22 and the upper interlayer insulator 24 are processed with higher accuracy. The positions, the shape (a planar shape and a cross-sectional shape), the forming area of the film forming area defining recesses 30 in the plan view are more likely to be proper as designed. The film forming area defining recesses 30 are not formed in the planarization film 20 having the larger thickness. This configuration is preferable for obtaining a proper level of moisture protection (to block moisture transmission). The film forming area defining recesses 30 (lower film forming area defining recesses 30a and upper film forming area defining recesses 30b, which will be described later) are drilled through the lower interlayer insulator 22 and the upper interlayer insulator 24. In comparison to a configuration in which the film forming area defining recesses do not include through holes, the film forming area defining recesses 30 are provided with the maximum depth. Therefore, the performance in definition of the film forming area to form the alignment film 10n further improves.

As illustrated in FIGS. 7 and 8, the film forming area defining recesses 30 are prepared by recessing the sections of the upper interlayer insulator 24 in the Y-axis direction. The upper interlayer insulator 24 is disposed closer to the alignment film 10n relative to the lower interlayer insulator 22. In comparison to a configuration in which the film forming area defining recesses are formed only in the lower interlayer insulator 22 and the upper interlayer insulator 24 is disposed between the film forming area defining recesses and the alignment film 10n, the film forming area defining function of the film forming area defining recesses 30 more directly affect the alignment film 10n. Therefore, the forming area of the alignment film 10n is more properly defined. The film forming area defining recesses 30 are formed in the lower interlayer insulator 22 and the upper interlayer insulator 24. The film forming area defining recesses 30 include the lower film forming area defining recesses 30a and the upper film forming area defining recesses 30b. The lower film forming area defining recesses 30a are prepared by recessing sections of the lower interlayer insulator 22 in the Y-axis direction. The upper film forming area defining recesses 30b are prepared by recessing sections of the upper interlayer insulator 24 in the Y-axis direction. The lower film forming area defining recesses 30a and the upper film forming area defining recesses 30b communicate with each other. In comparison to a configuration in which the film forming area defining recesses include only the upper film forming area defining recesses, the film forming area defining recesses 30 are provided with a depth that is larger by a depth of the lower film forming area defining recesses 30a in the lower interlayer insulator 22. Therefore, the performance in definition of the film forming area to form the alignment film 10n further improves.

As illustrated in FIGS. 8 and 9, first line protectors 31 prepared from the first transparent electrode film 23 are connected to the touch lines 15 via the lower film forming area defining recesses 30a drilled through the lower interlayer insulator 22. The first line protectors 31 are disposed to overlap sections of each of the touch lines 15 crossing three film forming area defining recesses 30 entirely in the width direction of the film forming area defining recesses 30 in the plan view. The first line protectors 31 are connected to the touch lines 15 for every three lower film forming area defining recesses 30a. Second line protectors 32 prepared from the second transparent electrode film 25 are connected to the first line protectors 31 via the upper film forming area defining recesses 30b drilled through the upper interlayer insulator 24. The second line protectors 32 are disposed to overlap sections of the first line protectors 31 (sections of each of the touch lines 15 crossing three film forming area defining recesses 30) entirely in the width direction of the film forming area defining recesses 30 in the plan view. The second line protectors 32 are connected to the first line protectors 31 for every three upper film forming area defining recesses 30b. With the first line protectors 31 and the second line protectors 32 connected to the touch lines 15 via the lower film forming area defining recesses 30a and the upper film forming area defining recesses 30b, the touch lines 15 are protected and the resistances of the touch lines 15 are reduced.

A illustrated in FIGS. 7 and 9, sections of the planarization film 20 overlapping the lower film forming area defining recesses 30a but not the touch lines 15 include secondary film forming area defining recesses 33. The secondary film forming area defining recesses 33 extend parallel to the film forming area defining recesses 30 and define the forming area of the alignment film 10n. Three secondary film forming area defining recesses 33 are arranged at intervals in the Y-axis direction and parallel to one another. The secondary film forming area defining recesses 33 are arranged to overlap large areas of three film forming area defining recesses 30 (areas except for overlapping areas with the touch lines 15) in the plan view. The lower film forming area defining recesses 30a drilled through the lower interlayer insulator 22 are prepared by etching sections of the lower insulator 22 to form the lower film forming area defining recesses 30a in the production. Specifically, a photoresist is applied to a surface of the lower interlayer insulator 22 after the lower interlayer insulator 22 is formed in a slid pattern and then the photoresist is exposed and developed. The sections of the lower interlayer insulator 22 to form the lower film forming area defining recesses 30a are exposed. After that, dry-etching or wet-etching is performed to etch sections of the lower film forming area defining recesses 30a exposed through the photoresist (the sections to form the lower film forming area defining recesses 30a). As a result, the lower film forming area defining recesses 30a are formed. The lower film forming area defining recesses 30a are drilled through the lower interlayer insulator 22. Therefore, the lower interlayer insulator 22 is over-etched and thus sections of the planarization film 20 in the lower layer are etched. Because of the over-etching, the secondary film forming area defining recesses 33 are formed in the sections of the planarization film 20 overlapping the lower film forming area defining recesses 30a but not the touch lines 15 to extend parallel to the film forming area defining recesses 30. The configuration, in the sections not overlapping the touch lines 15, the depth of the secondary film forming area defining recesses 33 is added to the depths of the lower film forming area defining recesses 30a and the upper film forming area defining recesses 30b. According to the configuration, the performance in definition of the film forming area to form the alignment film 10n further improves.

As illustrated in FIGS. 2 and 5, the touch lines 15 prepared from the third metal film 21, are connected to the touch leads 28 prepared from the second metal film 19 via contact holes drilled through the planarization film 20 at positions outside the sealant 10d (on an opposite side from the internal space 10IS side), as described earlier. The second metal film 19 is disposed in the layer that is lower than the third metal film 21. In comparison to a configuration in which the contact holes are located on the internal space 10IS side relative to the sealant 10d, this configuration is preferable for increasing the definition and reducing the frame width because the second metal film 19 can be used for different lines (e.g., the source lines 10j) in the internal space 10IS. In this embodiment, the third metal film 21 disposed in the layer that is upper than the planarization film 20 includes the sections configured as the touch lines 15. The lower interlayer insulator 22 and the upper interlayer insulator 24 disposed in the layer that is upper than the third metal film 21 include the film forming area defining recesses 30. According to the configuration, the reduction in flatness of the touch lines 15 resulting from the film forming area defining recesses 30 is less likely to occur but the definition of the forming area of the alignment film 10n can be properly performed.

As described above, the array substrate 10b (a display substrate) in this embodiment includes the glass substrate 10GS (the substrate), the planarization film 20 (the first insulator), the third metal film 21 (the metal film), the lower interlayer insulator 22, the upper interlayer insulator 24, the alignment film 10n, the touch lines 15 (the lines), and the film forming area defining recesses 30. The glass substrate 10GS includes the display area AA in which images can be displayed and the non-display area NAA on the outer edge side to surround the display area AA. The planarization film 20 is disposed to straddle the display area AA and the non-display are NAA of the glass substrate 10GS. The third metal film 21 is disposed in the layer that is upper than the planarization film 20 to straddle the display area AA and the non-display area NAA. The lower interlayer insulator 22 and the upper interlayer insulator 24 that are included in the second insulator have the thicknesses smaller than the thickness of the planarization film 20. The alignment film 10n disposed in the layer that is upper than the lower interlayer insulator 22 and the upper interlayer insulator 24 that are included in the second insulator is disposed at least in the display area AA. The touch lines 15 include sections of the third metal film 21 and extend to straddle the display area AA and the non-display area NAA. The film forming area defining recesses 30 are provided in the non-display area NAA such that the forming area defining recesses 30 extend to cross the touch lines 15. The film forming area defining recesses 30 include recessed sections of the lower interlayer insulator 22 and the upper interlayer insulator 24 that are the sections of the second insulator to define the forming area of the alignment film 10n.

In the formation of the alignment film 10n, the material of the alignment film 10n having the flowability is supplied to the display area AA of the glass substrate 10GS. The material flows to spread in the layer that is upper than the lower interlayer insulator 22 and the upper interlayer insulator 24 that are included in the second insulator that is disposed on the glass substrate 10GS. As a result, the alignment film 10n is formed at least in the display area AA. The material of the alignment film 10n supplied to the display area AA may reach the non-display area NAA. By defining the forming area of the alignment film 10n is defined with the film forming area defining recesses 30 in the non-display area NAA. Therefore, the material of the alignment film 10n is less likely to spread outer than the film forming area defining recesses 30 in the non-display area NAA. The film forming area defining recesses 30 extend to cross the touch lines and thus properly define the forming area of the alignment film 10n with respect to the extending direction of the film forming area defining recesses 30 whether or not the touch lines 15 are present.

The touch lines 15 extend to straddle the display area AA and the non-display area NAA of the glass substrate 10GS. The touch lines 15 include the sections of the third metal film 21 disposed in the layer that is upper than the planarization film 20 having the thickness larger than the thicknesses of the lower interlayer insulator 22 and the upper interlayer insulator 24 that include the sections of the second insulator. Therefore, the flatness of the touch lines 15 is ensured. The film forming area defining recesses 30 include the recessed sections of the lower interlayer insulator 22 and the upper interlayer insulator 24 that include the sections of the second insulator disposed in the layer that is upper than the third metal film 21. Although the film forming area defining recesses 30 extend to cross the touch lines 15, the film forming area defining recesses 30 are less likely to affect the flatness of the touch lines 15. Because the flatness of the touch lines 15 is ensured, in comparison to a configuration in which the film forming area defining recesses 30 are formed in the planarization film 20 to cross the touch lines 15, the touch lines 15 are less likely to have irregularity in thickness and thus less likely to have breaks. The lower interlayer insulator 22 and the upper interlayer insulator 24 that include the sections of the second insulator and the film forming area defining recesses 30 have the thicknesses smaller than the thickness of the planarization film 20. Therefore, the lower interlayer insulator 22 and the upper interlayer insulator 24 are processed with higher accuracy. The positions, the shape, and the area of the film forming area defining recesses 30 are more likely to be proper. The film forming area defining recesses 30 are not formed in the planarization film 20 having the larger thickness. This configuration is preferable for obtaining a proper level of moisture protection.

The second insulator includes the lower interlayer insulator 22 (the lower-side second insulator) on the lower-layer side and the upper interlayer insulator 24 (the upper-side second insulator) on the upper-layer side. The film forming area defining recesses 30 include the recessed sections of at least the upper interlayer insulator 24. Because the film forming area defining recesses are formed in the upper interlayer insulator 24 closer to the alignment film 10n relative to the lower interlayer insulator 22, in comparison to a configuration in which the film forming area defining recesses are formed only in the lower interlayer insulator 22 and the upper interlayer insulator 24 is disposed between the film forming area defining recesses 30 and the alignment film 10n, the film forming area defining function of the film forming area defining recesses 30 more directly affect the alignment film 10n. Therefore, the forming area of the alignment film 10n is more properly defined.

The film forming area defining recesses 30 include the lower film forming area defining recesses 30a and the upper film forming area defining recesses 30b. The lower film forming area defining recesses 30a include the recessed sections of the lower interlayer insulator 22. The upper film forming area defining recesses 30b include the recessed sections of the upper interlayer insulator 24. In comparison to a configuration in which the film forming area defining recesses include only the upper film forming area defining recesses, the depth of the film forming area defining recesses 30 is increased by the depth of the lower film forming area defining recesses 30a formed in the lower interlayer insulator 22. Therefore, the performance in definition of the film forming area to form the alignment film 10n further improves.

The lower film forming area defining recesses 30a are drilled through the lower interlayer insulator 22. The secondary film forming area defining recesses 33 are formed in the sections of the planarization film 20 overlapping the lower film forming area defining recesses 30a but not the touch lines 15. The secondary film forming area defining recesses 33 extend parallel to the film forming area defining recesses 30 to define the forming area of the alignment film 10n. The lower film forming area defining recesses 30a drilled through the lower interlayer insulator 22 are prepared by etching the sections of the lower interlayer insulator 22 to form the lower film forming area defining recesses 30a. The sections of the planarization film 20 overlapping the lower film forming area defining recesses 30a but not the touch lines 15 are over-etched during the etching the lower insulator 22. As a result, the secondary film forming area defining recesses 33 are formed to extend parallel to the film forming area defining recesses 30. The depth of the secondary film forming area defining recesses 33 is added to the depths of the lower film forming area defining recesses 30a and the upper film forming area defining recesses 30b.

According to the configuration, the performance in definition of the film forming area to form the alignment film 10n further improves.

The lower film forming area defining recesses 30a and the upper film forming area defining recesses 30b are drilled through the lower interlayer insulator 22 and the upper interlayer insulator 24, respectively. The first transparent electrode film 23, the second transparent electrode film 25, the first line protectors 31, and the second line protectors 32 are provided. The first transparent electrode film 23 is disposed between the lower interlayer insulator 22 and the upper interlayer insulator 24. The second transparent electrode film 25 is disposed in the layer that is upper than the upper interlayer insulator 24. The first line protectors 31 include the sections of the first transparent electrode film 23. At least sections of the first line protectors 31 overlap the touch lines 15. The first line protectors 31 are connected to the touch lines 15 via the lower film forming area defining recesses 30a. The second line protectors 32 include the sections of the second transparent electrode film 25. At least sections of the second line protectors 32 overlap the touch lines 15 and the first line protectors 31. The second line protectors 32 are connected to the first line protectors 31 via the upper film forming area defining recesses 30b. The lower film forming area defining recesses 30a and the upper film forming area defining recesses 30b are drilled through the lower interlayer insulator 22 and the upper interlayer insulator 24. In comparison to a configuration in which the lower film forming area defining recesses and the upper film forming area defining recesses do not include the through holes, the film forming area defining recesses 30 are provided with the larger depth. Therefore, the performance in definition of the film forming area to form the alignment film 10n further improves. The first line protectors 31 prepared from the first transparent electrode film 23 and the second line protectors 32 prepared from the second transparent electrode film 25 are disposed to overlap the touch lines 15 and connected to the touch lines 15 via the lower film forming area defining recesses 30a and the upper film forming area defining recesses 30b. According to the configuration, the touch lines 15 are protected and the resistances of the touch lines 15 are reduced.

The first transparent electrode film 23 is disposed between the lower interlayer insulator 22 and the upper interlayer insulator 24. The second transparent electrode film 25 is disposed in the layer that is upper than the upper interlayer insulator 24. The touch electrodes 14 (the position detection electrodes) include sections of the first transparent electrode film 23 or the second transparent electrode film 25. The touch electrodes 14 and the finger, which is the position input member for the position input, form capacitors therebetween to detect the positions of input by the finger that is the position input member. The touch lines 15 (the position detection lines) are connected to the touch electrodes 14. The touch electrodes 14 and the finger, which is the position input member for the position input, form the capacitors therebetween and the positions of input by the finger that is the position input member can be detected using the signals supplied through the touch lines 15. The touch lines 15 that are lines are less likely to have the breaks resulting from the film forming area defining recesses 30 and thus the position input function is properly performed.

The liquid crystal panel 10 (the display device) according to this embodiment includes the array substrate 10b described above and the CF substrate 10a (the opposed substrate) opposed to the array substrate 10b with the internal space 10IS therebetween. According to the liquid crystal panel 10 having such a configuration, the touch lines 15 are less likely to have the breaks resulting from the film forming area defining recesses 30. Therefore, a malfunction is less likely to occur.

The sealant 10d is disposed between the array substrate 10b and the CF substrate 10a in the non-display area NAA to surround and seal the internal space 10IS. The film forming area defining recesses 30 are arranged to overlap the sealant 10d and closer to the internal space 10IS relative to the outer edges of the sealant 10d. By defining the forming area of the alignment film 10n with the film forming area defining recesses, the alignment film 10n is less likely to reach at least the outer edges of the sealant 10d. According to the configuration, the fixing strength of the sealant 10d to the glass substrate 10GS is maintained at a sufficient level and thus the substrates are less likely to be removed.

The second metal film 19 (the lower metal film) disposed in the layer that is lower than the planarization film 20. The touch leads 28 (the leads) include sections of the second metal film 19 and are disposed on the opposite side from the internal space 10IS relative to the sealant 10d in the non-display area NAA. The touch leads 28 partially overlap the touch lines 15. The contact holes 29 are drilled through the sections of the planarization film 20 overlapping the touch lines 15 and the touch leads 28. The touch lines 15 are connected to the touch leads 28 that include the sections of the second metal film 19 via the contact holes 29 drilled through the planarization film 20. In comparison to a configuration in which the contact holes are arranged on the internal space 10IS side relative to the sealant 10d, this configuration is preferable for increasing the definition and reducing the frame width because the second metal film 19 can be used for the different lines in the internal space 10IS. The third metal film 21 disposed in the layer that is upper than the planarization film 20 includes the sections configured as the touch lines 15. However, the film forming area defining recesses 30 are formed in the lower interlayer insulator 22 and the upper interlayer insulator 24 that are sections of the second insulator disposed in the layer that is upper than the third metal film 21. Therefore, the forming area of the alignment film 10n is properly defined without a reduction in flatness of the touch lines 15 resulting from the film forming area defining recesses 30.

Second Embodiment

A second embodiment of the present invention will be described with reference to FIGS. 10 and 11. The second embodiment further includes film forming area defining recesses 130. Furthermore, the second embodiment includes second film forming area defining recesses 130. Configuration, functions, and effects similar to those of the first embodiment will not be described.

As illustrated in FIGS. 10 and 11, the film forming area defining recesses 130 in this embodiment are formed only in an upper interlayer insulator 124 and not formed in a lower interlayer insulator 122. Because the film forming area defining recesses 130 are not formed in a planarization film 120 and the lower interlayer insulator 122, a proper level of moisture protection is provided. Touch lines 115 prepared from a third metal film 121 are covered with the lower interlayer insulator 122 that does not include the film forming area defining recesses 130 and thus does not have openings. This configuration is preferable for protecting the touch lines 115. First overlapping portions 34 prepared from a first transparent electrode film 123 and second overlapping portions 35 prepared from a second transparent electrode film 125 are disposed to overlap three film forming area defining recesses 130 arranged in the Y-axis direction. Each of the first overlapping portions 34 and the second overlapping portions 35 has a forming area that overlap three film forming area defining recesses 130, sections of the lower interlayer insulator 122 between the film forming area defining recesses 130 that are adjacent to each other in the Y-axis direction, and a section of the lower interlayer insulator 122 on a display area AA side relative to the film forming area defining recess 130 that is the closest to the display area AA in a plan view. The forming area of the first overlapping portion 34 and the forming area of the second overlapping portion 35 are about equal to each other. According to the configuration, a surface of an array substrate 11b on which an alignment film 110n is formed (surfaces of the second transparent electrode film 125 and the upper interlayer insulator 124) includes two steps by the thicknesses of the first overlapping portion 34 and the second overlapping portion 35. During the formation of the alignment film 110n, a material of the alignment film 110n spreading from the display area AA to the non-display area NAA need to go over the two steps to reach the film forming area defining recesses 130. According to the configuration, performance in definition of the film forming area to form the alignment film 110n further improves.

In this embodiment, as described above, the film forming area defining recesses 130 include the recessed sections of the upper interlayer insulator 124. Because the film forming area defining recesses 130 are not formed in the planarization film 120 and the lower interlayer insulator 122, a higher level of moisture protection is provided. Furthermore, the touch lines 115 are covered with the lower interlayer insulator 122 that does not include the film forming area defining recesses 130. This configuration is preferable for protecting the touch lines 115.

This embodiment include the first transparent electrode film 123, the second transparent electrode film 125, the first overlapping portions 34, and the second overlapping portions 35. The first transparent electrode film 123 is disposed between the lower interlayer insulator 122 and the upper interlayer insulator 124. The second transparent electrode film 125 is disposed in the layer that is upper than the upper interlayer insulator 124. The first overlapping portions 34 include the sections of the first transparent electrode film 123. The first overlapping portions 34 are disposed to at least partially overlap the film forming area defining recesses 130. The second overlapping portions 35 include the sections of the second transparent electrode film 125. The second overlapping portions 35 are disposed to at least partially overlap the film forming area defining recesses 130. In this configuration, the first overlapping portions 34 that include the sections of the first transparent electrode film 123 and the second overlapping portions 35 that include the sections of the second transparent electrode film 125 are disposed to overlap the film forming area defining recesses 130 in the upper interlayer insulator 124. The surface of the array substrate 110b on which the alignment film 110n is formed includes steps by the thicknesses of the first overlapping portions 34 and the second overlapping portions 35. During the formation of the alignment film 110n, the material of the alignment film 110n spreading from the display area AA to the non-display area NAA need to go over the steps to reach the film forming area defining recesses 130. According to the configuration, performance in definition of the film forming area to form the alignment film 110n further improves.

Other Embodiment

The technology described herein is not limited to the embodiments described above and illustrated by the drawings. For example, the following embodiments will be included in the technical scope of the present invention.

(1) In each of the above embodiments, the touch lines connected to the touch electrodes are provided as an example of the "lines." The film forming area defining recesses cross the lines. However, the film forming area defining recesses may be formed to cross other lines. For example, in a liquid crystal panel that does not use a common electrode for a touch panel pattern, the common electrode may not include divided sections, a line for supplying image display reference potential to the common electrode may be prepared from the third metal film, and the film forming area defining recesses may be formed to cross the line. In this case, the liquid crystal panel may not have the touch panel function.

(2) In each of the above embodiments, the film forming area defining recesses disposed between the display are and the driver linearly extend in the X-axis direction without breaks. However, the film forming area defining recesses may linearly extend in the X-axis direction with breaks. The film forming area defining recess may not linearly extend in the X-axis direction. The film forming area defining recesses may have a wavy shape or a zigzag shape in a plan view.

(3) In each of the above embodiments, the touch leads are prepared from the second metal film. However, the touch leads may be prepared from the first metal film.

(40 In each of the above embodiments, the pixel electrodes are prepared from the first transparent electrode film and the common electrode is prepared from the second transparent electrode film. However, the pixel electrodes and the common electrode may be disposed opposite way around such that the pixel electrodes may be prepared from the second transparent electrode film and the common electrode may be prepared from the first transparent electrode film.

(5) In the first embodiment, the secondary film forming area defining recesses are provided in the planarization film included in the configuration in which the film forming area defining recesses are provided in the lower interlayer insulator and the upper interlayer insulator. However, the secondary film forming area defining recesses may be omitted.

(6) In the first embodiment, the lower film forming area defining recesses and the upper film forming area defining recesses have the same width. However, the width of the lower film forming area defining recesses and the width of the upper film forming area defining recesses may be different from each other.

(7) in the first embodiment, the first line protectors and the second line protectors are provided in the configuration in which the second film forming area defining recesses are formed in the lower interlayer insulator and the upper interlayer insulator. However, the first line protectors and/or the second line protectors may be omitted.

(8) In the second embodiment, the film forming area defining recesses are formed only in the upper inter layer insulator. However, the film forming area defining recesses may be formed only in the lower interlayer insulator.

(9) The second embodiment includes the first overlapping portions that include the sections of the first transparent electrode film and the second overlapping portions that include the sections of the second transparent electrode film. However, one of both of the first overlapping portions and the second overlapping portions may be omitted.

(10) In each of the above embodiments, the number of the film forming area defining recesses in the Y-axis direction is three. However, the number may be one, two, or four or greater.

(11) In each of the above embodiments, the planarization film is the single layer film made of the organic material. However, the planarization film may be a multilayer film including a layer made of an organic material and a layer made of an inorganic material.

(12) In each of the above embodiments, the alignment film is applied by the inkjet device. However, the alignment film may be applied using a printing device. The material of the alignment film used in either case has high flowability. Therefore, the forming areas need to be defined.

(13) In each of the above embodiments, two pixel overlapping openings 10h1 are provided in the common electrode. However, one pixel overlapping opening or three or more pixel overlapping openings may be provided. The outline of each pixel overlapping opening in the plan view may be altered from one that is illustrated in the drawing. The pixel overlapping openings may be provided in the pixel electrodes rather than the common electrode.

(14) The configuration of the pixels in the display area and the connecting structure of the touch lines to the touch electrodes may be altered from those in each of the above embodiment where appropriate.

(15) In each of the above embodiments, the CF substrate includes the light blocking portion. However, the array substrate may include the light blocking portion.

(16) The material of the semiconductor film from which the channels of the TFTs are prepared may be amorphous silicon or polysilicon rather than the material in each of the above embodiments. If the polysilicon is used for the material of the semiconductor film, it is preferable to use bottom gate type TFTs.

(17) In each of the above embodiments, the touch panel pattern uses the self-capacitance method. However, the touch panel pattern may use a mutual capacitance method.

(18) In each of the above embodiments, the transmissive liquid crystal panel is used. However, a reflective liquid crystal panel or a semitransmissive liquid crystal panel may be in the technical scope of the present invention.

(19) In each of the above embodiments, the shape of the liquid crystal display device (the liquid crystal panel or the backlight unit) in the plan view is vertically-long rectangular. However, the shape of the liquid crystal display device in the plan view may be horizontally-long rectangular, square, circular, semicircular, oval, elliptic, or trapezoidal.

(20) In each of the above embodiments, the liquid crystal panel has the configuration in which the liquid crystal layer is sandwiched between the substrates. However, a display panel including functional organic molecules other than the liquid crystal material sandwiched between substrates may be included in the technical scope of the present invention.

EXPLANATION OF SYMBOLS

10: Liquid crystal panel (Display device), 10a: CF substrate (Opposed substrate), 10b, 110b: Array substrate (Display substrate), 10d: Sealant, 10n, 110n: Alignment film, 10GS: Glass substrate (Substrate) 10IS: Internal space, 14: Touch electrode (Position detection electrode), 15, 115: Much line (Lines, Position detection line), 16: First metal film (Lower metal film). 19: Second metal film (Lower metal film), 20, 120: Planarization film (First insulator), 21, 121: Third metal film (Metal film), 22, 122: Lower interlayer insulator (Second insulator, Lower second Insulator), 23, 123: First transparent electrode film, 24, 124: Upper interlayer insulator (Second insulator, Upper second insulator), 25, 125: Second transparent electrode film, 28: Touch lead (Lead), 29: Contact hole, 30, 130: Film forming area defining recess, 30a: First film forming area defining recess, 30b: Second film forming area defining recess, 31: First line protecting section, 32: Second line protecting section, 33: Secondary film forming area defining recess, 34: First overlapping portion, 35: Second overlapping portion, AA: Display area, NAA: Non-display area

The invention claimed is:

1. A display substrate comprising:
a substrate including a display area in which an image is displayed and a non-display area on an outer edge side to surround the display area;
a first insulator disposed to straddle the display area and the non-display area of the substrate;
a metal film disposed in a layer upper than the first insulator to straddle the display area and the non-display area of the substrate;
a second insulator disposed in a layer upper than the metal film to straddle the display area and the non-display area of the substrate, the second insulator having a thickness smaller than a thickness of the first insulator;
an alignment film disposed in a layer upper than the second insulator at least in the display area;
a line extending to straddle the display area and the non-display area, the line including a section of the metal film; and
film forming area defining recesses provided in the non-display area to extend to cross the line, the film forming area defining recesses include recessed sections of the second insulator to define a forming area of the alignment film, wherein
the second insulator includes a lower second insulator disposed in a lower layer and an upper second insulator disposed in an upper layer, and
the film forming area defining recesses include at least recessed sections of the upper second insulator.

2. The display substrate according to claim 1, wherein
the film forming area defining recesses include lower film forming area defining recesses and upper film forming area defining recesses,
the lower film forming area defining recesses include recessed sections of the lower second insulator, and
the upper film forming area defining recesses include recessed sections of the upper second insulator.

3. The display substrate according to claim 2, wherein
the lower film forming area defining recesses including through holes in the lower second insulator, and
sections of the first insulator overlapping the lower film forming area defining recesses but not the line include secondary film forming area defining recesses extending parallel to the film forming area defining recesses and defining the forming area of the alignment film.

4. The display substrate according to claim 2, wherein
the lower film forming area defining recesses include through holes in the lower second insulator and the upper film forming area defining recesses include through holes in the upper second insulator, and
the display substrate further comprises:
a first transparent electrode film disposed between the lower second insulator and the upper second insulator;
a second transparent electrode film disposed in a layer upper than the upper second insulator;
first line protectors including sections of the first transparent electrode film to at least partially overlap the line and being connected to the line via the lower film forming area defining recesses; and second line protectors including sections of the second transparent electrode film to at least partially overlap the line and the first line protectors and being connected to the first line protectors via the upper film forming area defining recesses.

5. The display substrate according to claim 1, wherein the film forming area defining recesses include recessed sections of the upper second insulator.

6. The display substrate according to claim 5, further comprising:
a first transparent electrode film disposed between the lower second insulator and the upper second insulator;
a second transparent electrode film disposed in a layer upper than the upper second insulator;
first overlapping portions including sections of the first transparent electrode film to at least partially overlap the film forming area defining recesses; and
second overlapping portions including sections of the second transparent electrode film to at least partially overlap the film forming area defining recesses.

7. The display substrate according to claim 1, further comprises:
a first transparent electrode film disposed between the lower second insulator and the upper second insulator;
a second transparent electrode film disposed in a layer upper than the upper second insulator; and
position detection electrodes including sections of the first transparent electrode film or the second transparent electrode film, the position detection electrodes form a capacitor with a position input member by which a position input is performed to detect a position of input by the position input member, wherein
the line includes a position detection line connected to the position detection electrodes.

8. A display device comprising:
the display substrate according to claim 1; and
an opposed substrate opposed to the display substrate with an internal space between the display substrate and the opposed substrate.

9. The display device according to claim 8, further comprising a sealant disposed between the display substrate and the opposed substrate in the non-display area to surround and seal the internal space, wherein
the film forming area defining recesses are located at positions overlapping the sealant and closer to the internal space relative to an outer edge of the sealant.

10. The display device according to claim 9, further comprising:
a lower metal film disposed in a layer lower than the first insulator; and
a lead disposed on an opposite side from the internal space relative to the sealant in the non-display area, the lead including a section of the lower metal film and including a section overlapping the line, wherein
the first insulator includes contact holes in sections overlapping the line and the lead.

* * * * *